(12) United States Patent
Son

(10) Patent No.: US 11,593,742 B2
(45) Date of Patent: *Feb. 28, 2023

(54) SYSTEMS AND METHOD FOR WORKFLOW EDITING

(71) Applicant: Coupang Corp., Seoul (KR)

(72) Inventor: Jae Hyun Son, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/363,941

(22) Filed: Jun. 30, 2021

(65) Prior Publication Data

US 2022/0156654 A1    May 19, 2022

Related U.S. Application Data

(63) Continuation of application No. 16/951,721, filed on Nov. 18, 2020, now Pat. No. 11,080,636.

(51) Int. Cl.
*G06Q 10/06* (2012.01)
*G06F 3/0482* (2013.01)
(Continued)

(52) U.S. Cl.
CPC ....... *G06Q 10/0633* (2013.01); *G06F 3/0482* (2013.01); *G06Q 10/083* (2013.01)

(58) Field of Classification Search
CPC ............ G06Q 10/00–50/00; G06F 1/00–30/00
(Continued)

(56) References Cited

U.S. PATENT DOCUMENTS 6,225,998 B1 * 5/2001 Okita .................. G06F 8/34
707/999.102
6,243,092 B1 * 6/2001 Okita .................. H04M 3/523
715/965

(Continued)

FOREIGN PATENT DOCUMENTS

CN        107590070        1/2018
JP        2009-545797      12/2009
(Continued)

OTHER PUBLICATIONS

Office Action dated Feb. 17, 2022, by the Taiwanese Patent Office in counterpart Taiwanese Application No. 110116223, 20 pages.
(Continued)

*Primary Examiner* — Alan S Miller
(74) *Attorney, Agent, or Firm* — Finnegan, Henderson, Farabow, Garrett & Dunner LLP

(57) ABSTRACT

A system for editing workflows as described herein, which may include a memory storing instructions and at least one processor configured to execute instructions. The instructions may cause the processor to display, on a graphical user interface an existing workflow, wherein the workflow comprises a plurality of blocks. Edits to the plurality of blocks may be received from a user, wherein edits comprise at least edits to an individual block or an interconnection between the plurality of blocks. Further, a modified workflow based on the received edits may be created and propagated to replace existing workflows within the system. Lastly, a graphical user interface may display the modified workflows for further editing.

20 Claims, 31 Drawing Sheets

(51) Int. Cl.
*G06Q 10/08* (2012.01)
*G06Q 10/0633* (2023.01)
*G06Q 10/083* (2023.01)

(58) Field of Classification Search
USPC .............................................. 705/7.11–7.42
See application file for complete search history.

(56) References Cited

U.S. PATENT DOCUMENTS

| | | | | |
|---|---|---|---|---|
| 7,346,531 | B2 * | 3/2008 | Jacobs | G06Q 10/109 |
| | | | | 705/7.14 |
| 7,707,055 | B2 * | 4/2010 | Behmoiras | G06Q 20/085 |
| | | | | 705/29 |
| 8,635,113 | B2 * | 1/2014 | Borders | G06Q 10/101 |
| | | | | 705/27.1 |
| 8,660,881 | B2 * | 2/2014 | Wood | G06Q 10/06316 |
| | | | | 705/7.26 |
| 9,395,959 | B2 * | 7/2016 | Hatfield | G06Q 10/06 |
| 9,401,051 | B2 * | 7/2016 | Huber | G16H 30/40 |
| 9,697,548 | B1 | 7/2017 | Jaff et al. | |
| 10,108,593 | B2 | 10/2018 | Mauceri, Jr. et al. | |
| 2002/0042756 | A1 * | 4/2002 | Kumar | G06Q 30/06 |
| | | | | 705/7.31 |
| 2003/0084016 | A1 * | 5/2003 | Norgaard | G06Q 10/10 |
| | | | | 706/60 |
| 2003/0182245 | A1 * | 9/2003 | Seo | G06Q 20/401 |
| | | | | 705/75 |
| 2003/0187756 | A1 * | 10/2003 | Klivington | G06Q 50/16 |
| | | | | 715/224 |
| 2003/0233374 | A1 * | 12/2003 | Spinola | G06Q 10/08 |
| 2004/0117528 | A1 * | 6/2004 | Beacher | G06Q 30/0603 |
| | | | | 710/111 |
| 2006/0074734 | A1 * | 4/2006 | Shukla | G06F 8/10 |
| | | | | 717/107 |
| 2006/0095473 | A1 * | 5/2006 | Fox | G06Q 10/10 |
| 2007/0143736 | A1 * | 6/2007 | Moriarty | G06Q 10/06 |
| | | | | 715/201 |
| 2007/0162353 | A1 * | 7/2007 | Borders | G06Q 10/101 |
| | | | | 705/26.81 |
| 2008/0162304 | A1 * | 7/2008 | Ourega | G06Q 30/0619 |
| | | | | 705/26.4 |
| 2009/0125416 | A1 | 5/2009 | Jooste et al. | |
| 2010/0246999 | A1 * | 9/2010 | Tillberg | G06Q 10/10 |
| | | | | 382/309 |
| 2012/0109774 | A1 | 5/2012 | Chernenko et al. | |
| 2012/0310699 | A1 | 12/2012 | McKenna et al. | |
| 2014/0082095 | A1 * | 3/2014 | Balinsky | G06Q 10/0633 |
| | | | | 709/206 |
| 2016/0012465 | A1 * | 1/2016 | Sharp | G06Q 20/321 |
| | | | | 705/14.17 |

FOREIGN PATENT DOCUMENTS

| | | |
|---|---|---|
| KR | 10-2006-0048776 | 5/2006 |
| KR | 10-2013-0116165 | 10/2013 |
| TW | I636410 B | 9/2018 |
| TW | 202006614 A | 2/2020 |
| TW | 202040520 A | 11/2020 |
| WO | WO 2015/095738 A1 | 6/2015 |

OTHER PUBLICATIONS

International Search Report and Written Opinion dated Aug. 13, 2021, in counterpart PCT International Application No. PCT/IB2021/062328, 9 pages.
Office Action dated Jun. 9, 2022, by the Hong Kong Patent Office in counterpart Hong Kong Application No. 22021032434.3, 8 pages.
Notice of Preliminary Rejection dated Oct. 28, 2022, by the Korean Patent Office in counterpart Korean Application No. 10-2021-7019560, 32 pages.

* cited by examiner

SYSTEMS AND METHOD FOR WORKFLOW EDITING

CROSS-REFERENCE TO RELATED APPLICATIONS

This application is a continuation of U.S. patent application Ser. No. 16/951,721 (now allowed) filed on Nov. 18, 2020, the entire contents of which are hereby incorporated by reference in the present application.

TECHNICAL FIELD

The present disclosure generally relates to computerized systems and methods for return workflow editing. In particular, embodiments of the present disclosure relate to inventive and unconventional systems relate to providing an easy to use graphical user interface for code free editing of workflows related to shipping networks.

BACKGROUND

In the area of fulfilling consumer orders for products, systems are used to handle issues that may arise after an individual has placed an order. For example, a consumer may decide to return, exchange, or cancel an item, which may be at any of a number of particular stages of processing or shipping. With fulfillment services moving extremely quickly to satisfy consumer demand, fast and efficient processing of consumer requests is important to ensuring high fulfillment throughput, minimal strain on computing resources, and maintaining consumer satisfaction.

Current systems for editing workflows for processing consumer returns, exchanges and cancellation are complex and are overly complicated for average end user to grasp. Traditional techniques often involve developer teams and full departments to make changes in workflows. Paying developers or keeping whole support departments to maintain a workflow system may be prohibitively expensive. Current systems are also inflexible and take time to implement changes. Even making a simplest change make take weeks to implement.

In a fast-paced environment such as a fulfilment center ability to make on the fly edits is crucial. Traditional workflow editing using computer systems is difficult from a technical and practical perspective. Non-technical users in particular have difficulty editing return workflows.

Therefore, there is a need for improved methods and systems for editing workflows so non-technical users and business units can change the workflow as needed to reflect the change in their process without involving developers and other technical specialists.

SUMMARY

One aspect of the present disclosure is directed to a system for workflow editing. The system may include a memory storing instructions and at least one processor configured to execute instructions. The instructions may cause the processor to display, on a graphical user interface an existing workflow, wherein the workflow comprises a plurality of blocks, and receiving edits to the plurality of blocks from a user, wherein edits comprise at least edits to an individual block or an interconnection between the plurality of blocks. Further, the instructions may include creating a modified workflow based on the received edits, propagating the modified workflow to replace the existing workflow within the system, and displaying on the graphical user interface the modified workflow.

Another aspect of the present disclosure is directed to a method for workflow editing. The method may include steps for displaying on a graphical user interface an existing workflow, wherein the workflow comprises a plurality of blocks, and receiving edits to the plurality of blocks from a user, wherein edits comprise at least edits to an individual block or an interconnection between the plurality of blocks. The method may also include additional steps for creating a modified workflow based on the received edits, propagating the modified workflow to replace the existing workflow within the system, and displaying on the graphical user interface the modified workflow.

Yet another aspect of the present disclosure is directed to workflow editing, wherein the workflow comprises a plurality of blocks. And block themselves may include various instructions. The instructions may include: determining whether an order is cancelled before payment; determining whether a promotion applies to the order; determining a type of the order; approving or denying cancellation; creating a record of the cancellation request. When the type of the order is an event ticket the instructions may also include: nullifying the event ticket; notifying an event venue; registering the event ticket cancellation; and generating a receipt for the event cancellation. When the type of the order is a product the instructions may also include: registering the product cancellation information; determining current fulfillment status of the product; initiating a return workflow; and issuing a refund for the product. The instructions may further include: retrieving data for accepting returns; determining whether it is a third party return; registering a return request; determining a consumer type; determining eligibility for a free return; and determining eligibility for a returnless refund. Additionally, the instructions may include: setting a post-return process; determining a fulfilment status; requesting a retrieval; verifying the retrieval status; approving or denying return; and initiating an order cancellation workflow. Furthermore, the instructions may include: determining a retrieval tracking type; determining whether an exchange retrieval is possible; recording retrieval information updates; determining whether an exchange delivery is requested; setting reattempt conditions for a retrieval; updating the reattempt conditions; determining eligibility for automatic cancellation; and initiating cancellation workflow. Lastly, instructions may also include: determining eligibility for a refund; issuing a refund notification; determining pending workflows affected by a withdrawal request; and canceling the pending workflows based on the withdrawal request.

Yet another aspect of the present disclosure is directed to a computer-implemented system for workflow editing. The system may include a memory storing instructions and at least one processor configured to execute instructions. Instructions may include displaying on a graphical user interface a return workflow, wherein the workflow comprises a plurality of sequentially blocks wherein: first block comprising instructions to retrieve data for accepting returns; second block comprising instructions to determine whether it is a third party return; third block comprising instructions to register a return request; fourth block comprising instructions to determine a consumer type; fifth block comprising instructions to determine eligibility for a free return; and sixth block comprising instructions to determine eligibility for a returnless refund. Instructions may further comprise receiving edits to the return workflow from a user, wherein edits comprise at least removal of one of the blocks from the plurality of blocks, creating a modified workflow based on the received edits, propagating the modified workflow to replace the existing workflow within the system, and displaying on the graphical user interface the modified workflow.

Other systems, methods, and computer-readable media are also discussed herein.

DETAILED DESCRIPTION

Figure 1A:
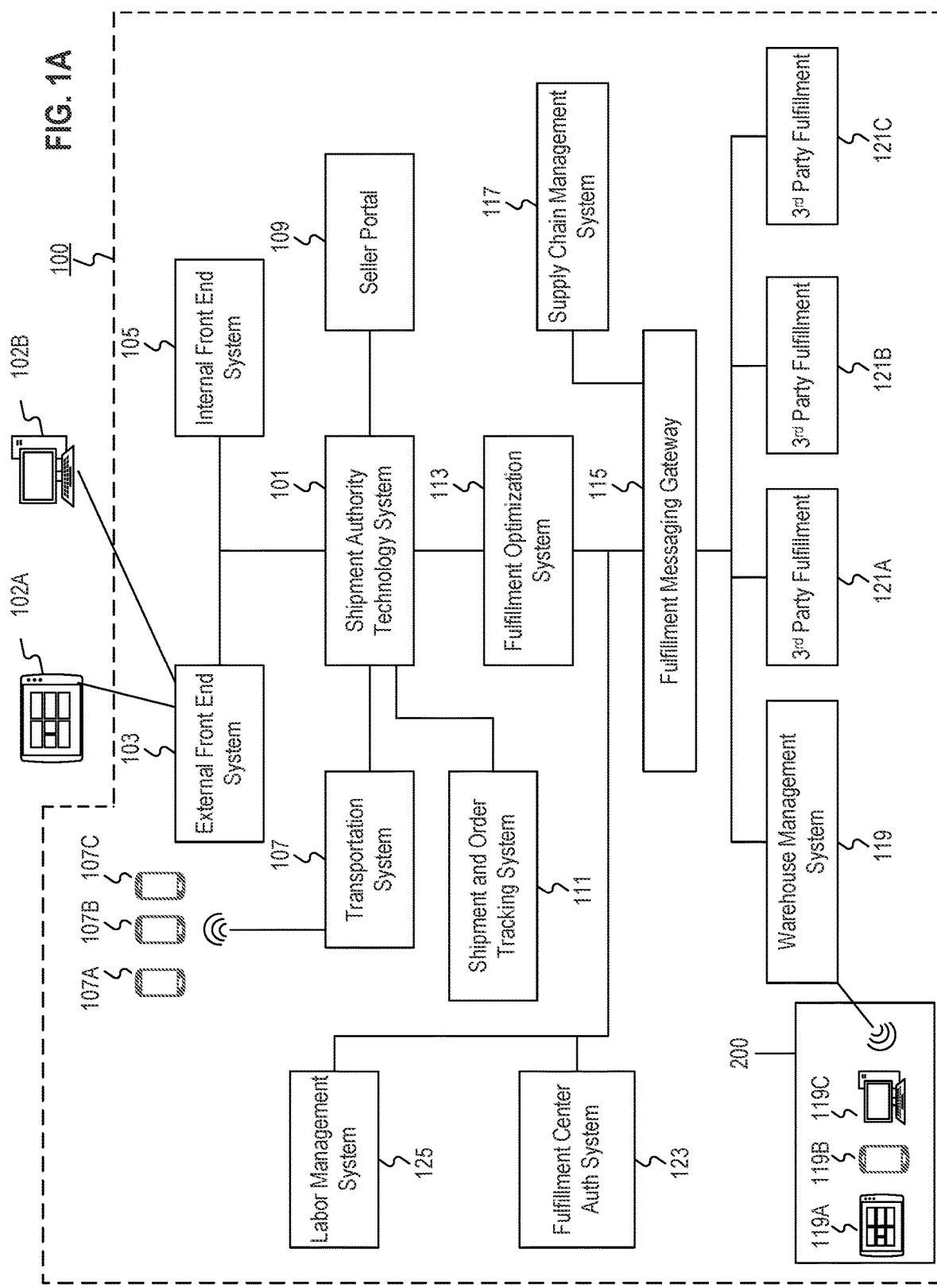
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Display Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for workflow editing. In particular, some embodiments are directed to workflow editing relating to item return processes.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), 3$^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering consumer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of consumers who bought this product and at least one other product), answers to frequently asked questions, reviews from consumers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
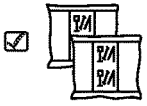
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by consumers (e.g., by a user using devices 102A-102B). In some embodiments, shipment and order tracking system 111 may request or store information from web servers (not pictured) operated by shipping companies that deliver packages containing products ordered by consumers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for consumer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many consumers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

3rd party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to consumers directly. In some embodiments, one or more of 3PL systems 121A-121C may be part of system 100, while in other embodiments, one or more of 3PL systems 121A-121C may be outside of system 100 (e.g., owned or operated by a third party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
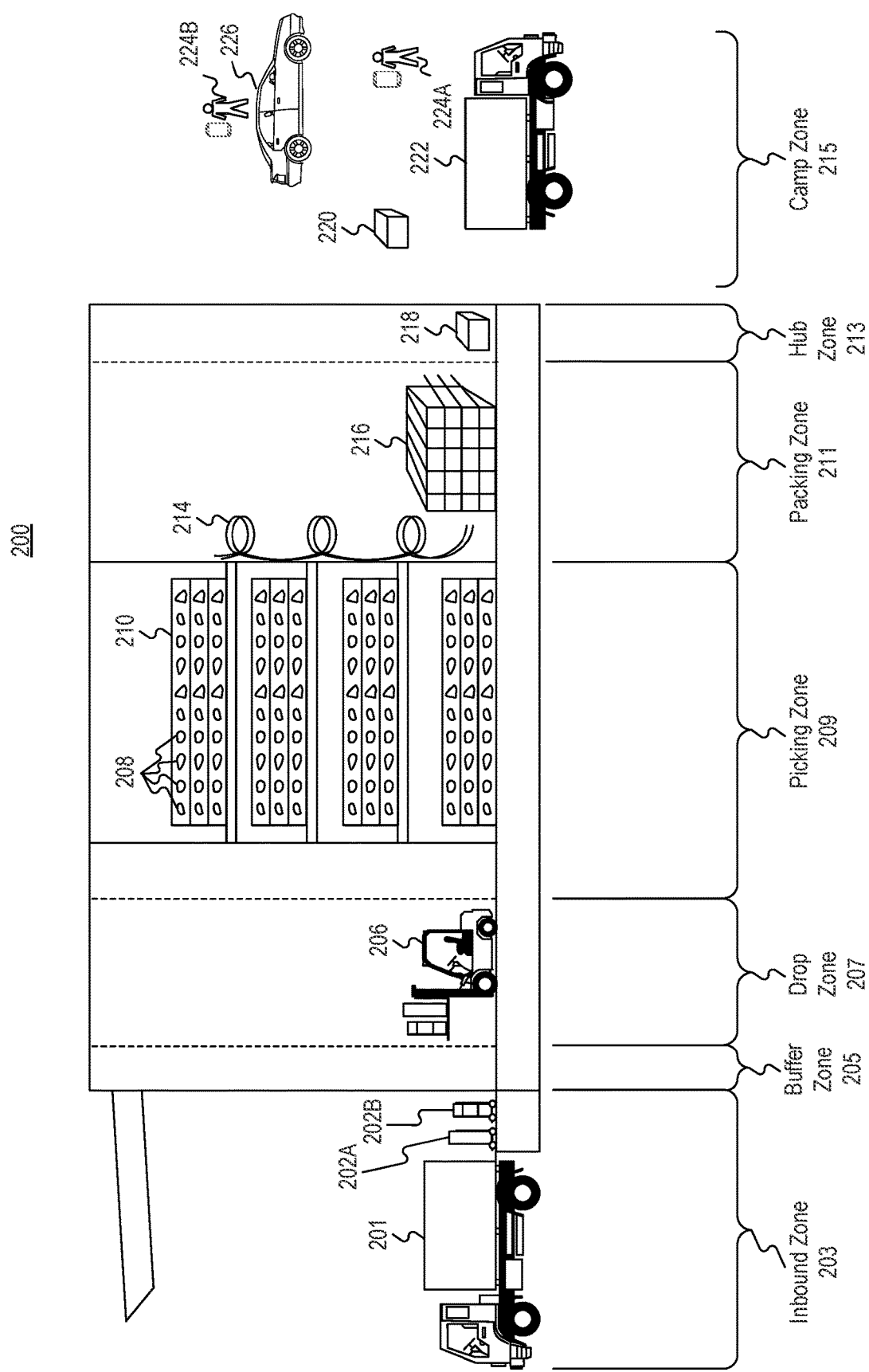
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to consumers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to consumers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or subroute a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or subroute, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3A:
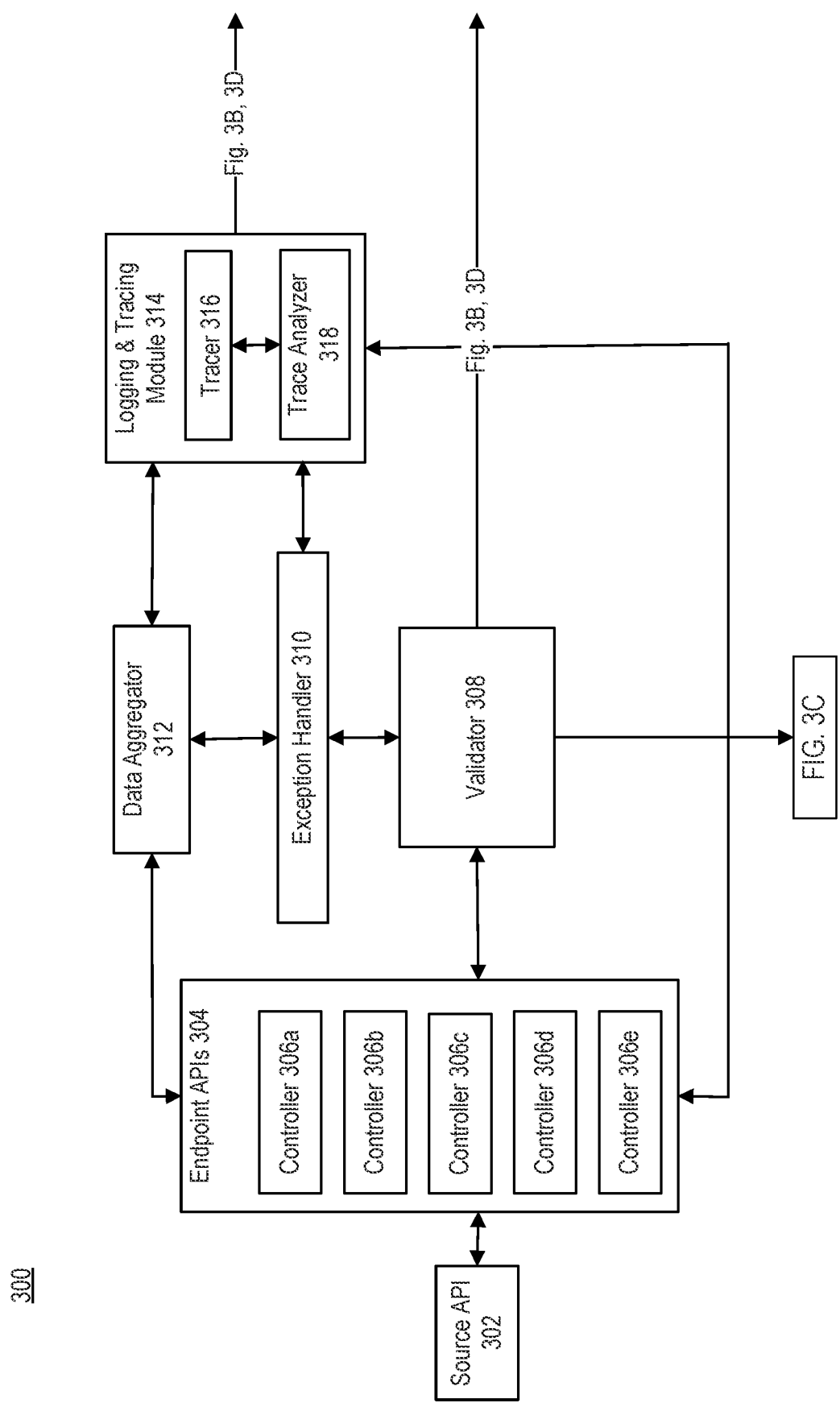
FIG. 3A illustrates an exemplary pictographic representation of an intake sub-system 300.

FIG. 3A illustrates an exemplary pictographic representation of an intake sub-system 300. Intake sub-system 300 may be designated for initial processing of a communication from a source application program interface (API) 302. Source API 302 may be any one of a number of APIs, which may be specifically configured for use by a consumer, a delivery-person, an administrator, and/or a seller. Source API 302 may be implemented on a computing device having a processor, memory component, and/or communications component, such as a mobile device, a desktop computer, an adapter, a controller, a server, or any other device capable of sending and/or receiving API communications. In some embodiments, intake sub-system 300 and/or components of intake sub-system 300 may be communicably coupled to other sub-systems (e.g., as described in FIGS. 3B-3D).

Intake sub-system 300 may also include a number of endpoint APIs 304, to which source API 302 may be communicably coupled. In some embodiments, endpoint APIs 304 may only be a single endpoint API. Endpoint APIs 304 may include a plurality of controllers, adapters, and/or other computing devices, which may be managed by an API provider (not shown). For example, endpoint APIs 304 may be implemented by a combination of controllers, such as controller 306a, controller 306b, controller 306c, controller 306d, and/or controller 306e. In some embodiments, a controller may be designated for handling operations for a particular entity (e.g., a seller). A controller may be a hardware device or a software program, which may manage dataflows between different entities (e.g., between source API 302 and data aggregator 312). For example, a controller may be, without limitation, a flash controller, an application delivery controller, a primary domain controller, a baseboard management controller, and/or a session border controller. In some embodiments, a communication from source API 302 may be directed to a specific endpoint API or controller based on a source associated with the communication. For example, an API provider may receive a communication from a source API 302 and may determine (e.g., based on a message identifier, IP address, MAC address, communication format, and/or other unique identifier) a source and/or type of the communication. Based on the identified communication source and/or communication type, the API provider may direct the communication to a particular controller, which may be configured for communications of having a particular source and/or type. By way of further example, API provider may determine that a communication from source API 302 has a consumer device as its communication source and a return request as its communication type, and may direct the communication to an endpoint API 304 (e.g., controller 306b), which may be configured for handling communications having a source and/or type of the received communication (e.g., configured for return request communications).

Intake sub-system 300 may also include a validator 308, which may validate communications from a source API 302, and may be communicably coupled to endpoint APIs 304. Validator 308 may exist within an endpoint API 304 (e.g., as part of a controller), or may exist as a separate component, such as a server, to which an endpoint API 304 may be connected. Validator 308 may include various components (e.g., modules, devices, processors, etc.) configured to carry out a validation process (e.g., a process for validating communications received from a source API 302). For example, validator 308 may include a validator invoker, a validation pre-processor (e.g., for re-formatting data from a communication), a validator processor (e.g., for performing validation operations to data), a validator post-processor (e.g., for re-formatting validated data to a format understandable by another entity, such as rule engine 362 in FIG. 3C), a validation manager, and/or a message publisher (which may direct messages to another sub-system).

Intake sub-system 300 may also include an exception handler 310, to which validator 308 may be communicably coupled. Exception handler 310 may be part of validator 308, or may be a separate device or component, such as a server or mobile device. In some embodiments, validator 308 may direct a communication to exception handler 310 based on a validation result of a communication, which may have been determined by validator 308. For example, if a communication fails at least one rule or algorithm implemented by validator 308, validator may direct the communication to exception handler 310. In some embodiments, exception handler 310 may be configured re-format, split, parse, tag, and/or otherwise re-configure or transmit information from the communication (e.g., issuing an alert to an administrator device) based on the at least one rule or algorithm failed by the communication. Exception handler 310 may be communicably coupled to a data aggregator 312 and/or a logging & tracing module 314.

Intake sub-system 300 may also include a data aggregator 312, which may aggregate data from different sources, such as endpoint APIs 304, exception handler 310, and/or logging & tracing module 314. Data aggregator 312 may be communicably coupled to any device and/or component of sub-system 300, as well as devices and/or components of other systems including sub-systems 325 in FIG. 3B, 355 in FIG. 3C, and 375 in FIG. 3D. Data aggregator 312 may be part of a device having another purpose (e.g., validator 308), or may be a separate device or component, such as a server or mobile device. In some embodiments, data aggregator 312 may include various components (e.g., modules, devices, processors, etc.) configured to carry out a data aggregation process (e.g., a process for aggregating and/or analyzing data from sources such as a source API 302 and/or exception handler 310). For example, data aggregator 312 may include a data caching component, a data aggregator component, a data transformation component, a data mapping component, and/or a service router.

Intake sub-system 300 may also include a logging & tracing module 314, which may log and/or trace data associated with communications (e.g., communications from an API source 302). Logging & tracing module 314 may be part of a device having another purpose (e.g., data aggregator 312), or may be a separate device or component, such as a server or mobile device. In some embodiments, logging & tracing module 314 may include various components (e.g., modules, devices, processors, etc.) configured to carry out a data aggregation process (e.g., a process for tracing and/or logging data from sources such as a source API 302 and/or exception handler 310). For example, logging & tracing module 314 may include tracer 316 and/or trace analyzer 318.

Tracer 316 may perform functions to trace data, such as data associated with a communication from an API source 302, validator 308, etc. In some embodiments, tracer 316 may be configured to add trace identifiers and/or span identifiers to data associated with a communication. In some embodiments, tracer 316 may maintain definitions (e.g., user-defined, machine-defined, and/or a combination of user-defined and machine-defined) related to logging and tracing, such as definitions for where to transmit trace and/or log data, a threshold number of traces and/or logs to keep, data formats, particular combinations of identifiers to transmit, and/or particular libraries to trace. In some embodiments, tracer 316 may implement aspects of a function provider, such as Spring Cloud Sleuth.

Trace analyzer 318 may perform functions to analyze data, such as trace data and/or log data, which may be associated with communications from a device (e.g., a device implementing source API 302). For example, trace analyzer 318 may aggregate timing data (e.g., times when an exception occurred, exception frequency, etc.), a tag, rule failure data, rule satisfaction data, a device identifier, a message identifier, and/or any data associated with a source API 302. In some embodiments, trace analyzer 318 may generate visual representations of trace and/or log data (e.g., charts of filterable data, line diagrams, recommendations generated by statistical and/or machine learning algorithms, etc.). In some embodiments, trace analyzer 318 may implement aspects of a function provider, such as Zipkin.

Figure 3B:
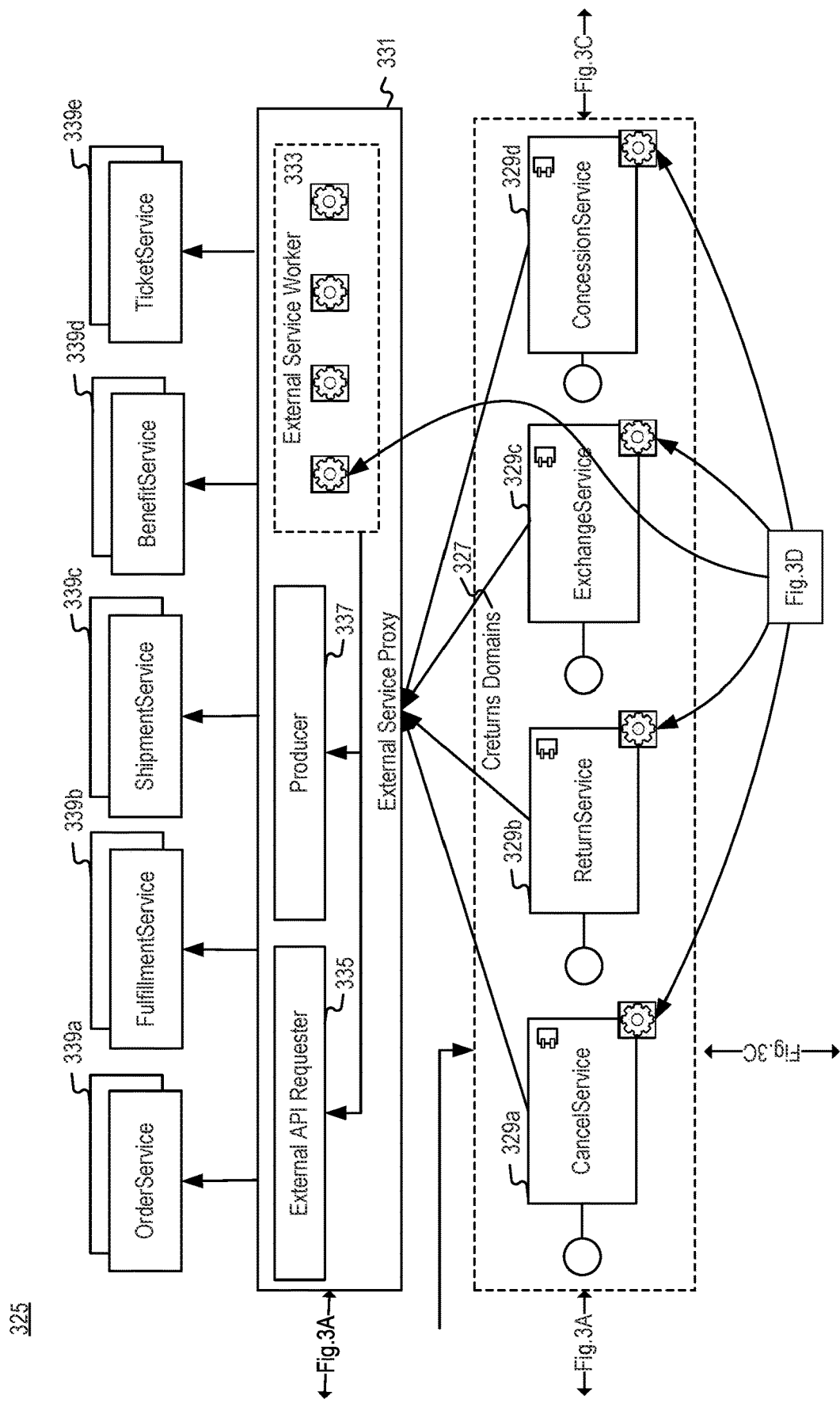
FIG. 3B illustrates an exemplary pictographic representation of an output sub-system 325.

FIG. 3B illustrates an exemplary pictographic representation of an output sub-system 325. Output sub-system 325 may be designated for processing output of the workflow sub-system 375 in FIG. 3D. Output sub-system 325 may pass processed output to external data sources 370 in FIG. 3C, pass processed output to be logged and/or traced with the logging & tracing module 314 in FIG. 3A and/or one or more of the external services 339a-e. Output sub-system 325 may be specifically configured for use by a consumer, a delivery-person, an administrator, and/or a seller. Output sub-system 325 may be implemented on a computing device having a processor, memory component, and/or communications component. In some embodiments, output sub-system 325 and/or components of output sub-system 325 may be communicably coupled to other sub-systems (e.g., as described in FIGS. 3A-3D).

Figure 3C:
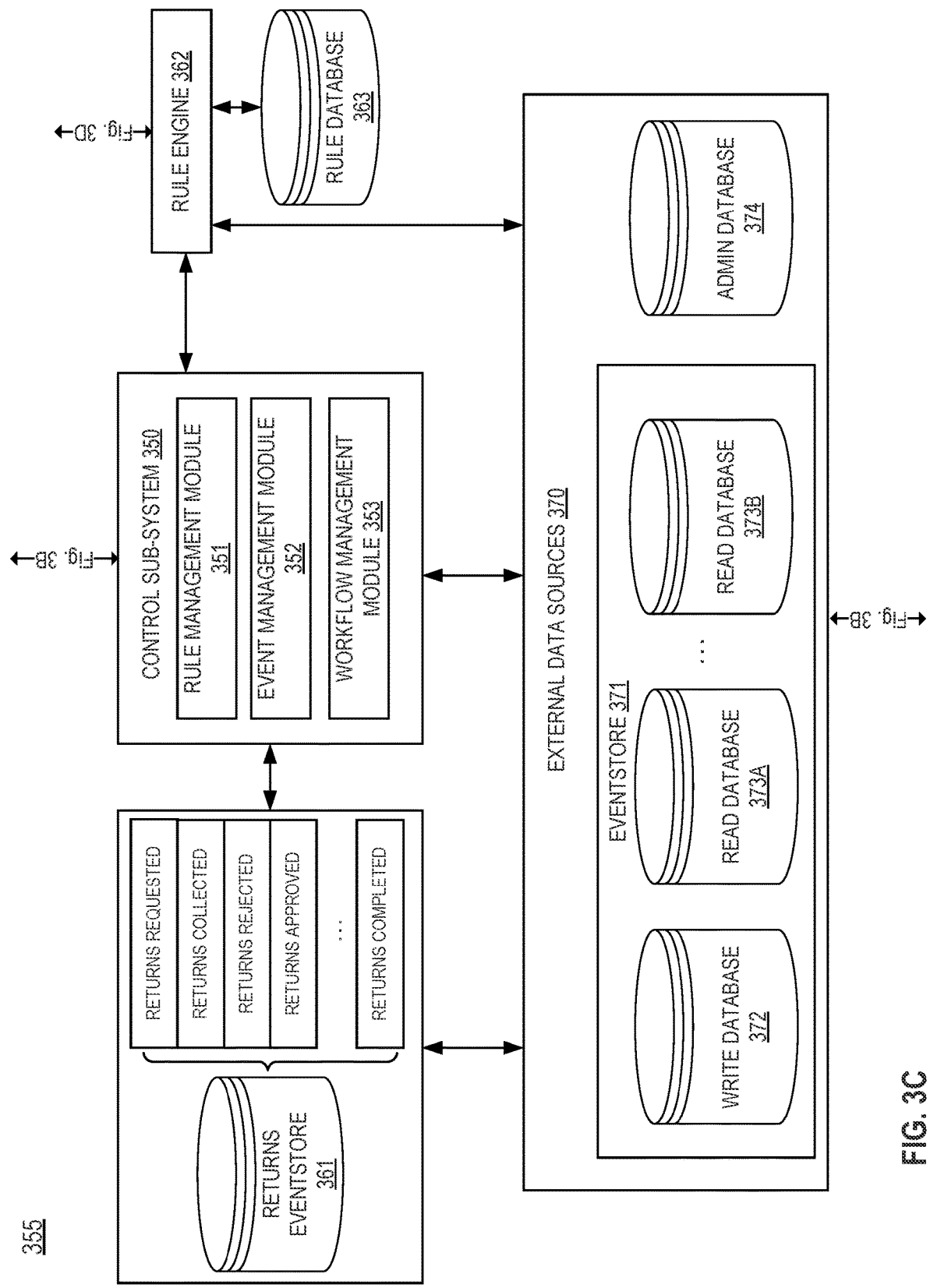
FIG. 3C illustrates a pictographic representation of an exemplary control sub-system, an exemplary returns event store, an exemplary rule engine, and exemplary external data sources, consistent with disclosed embodiments.
Figure 3D:
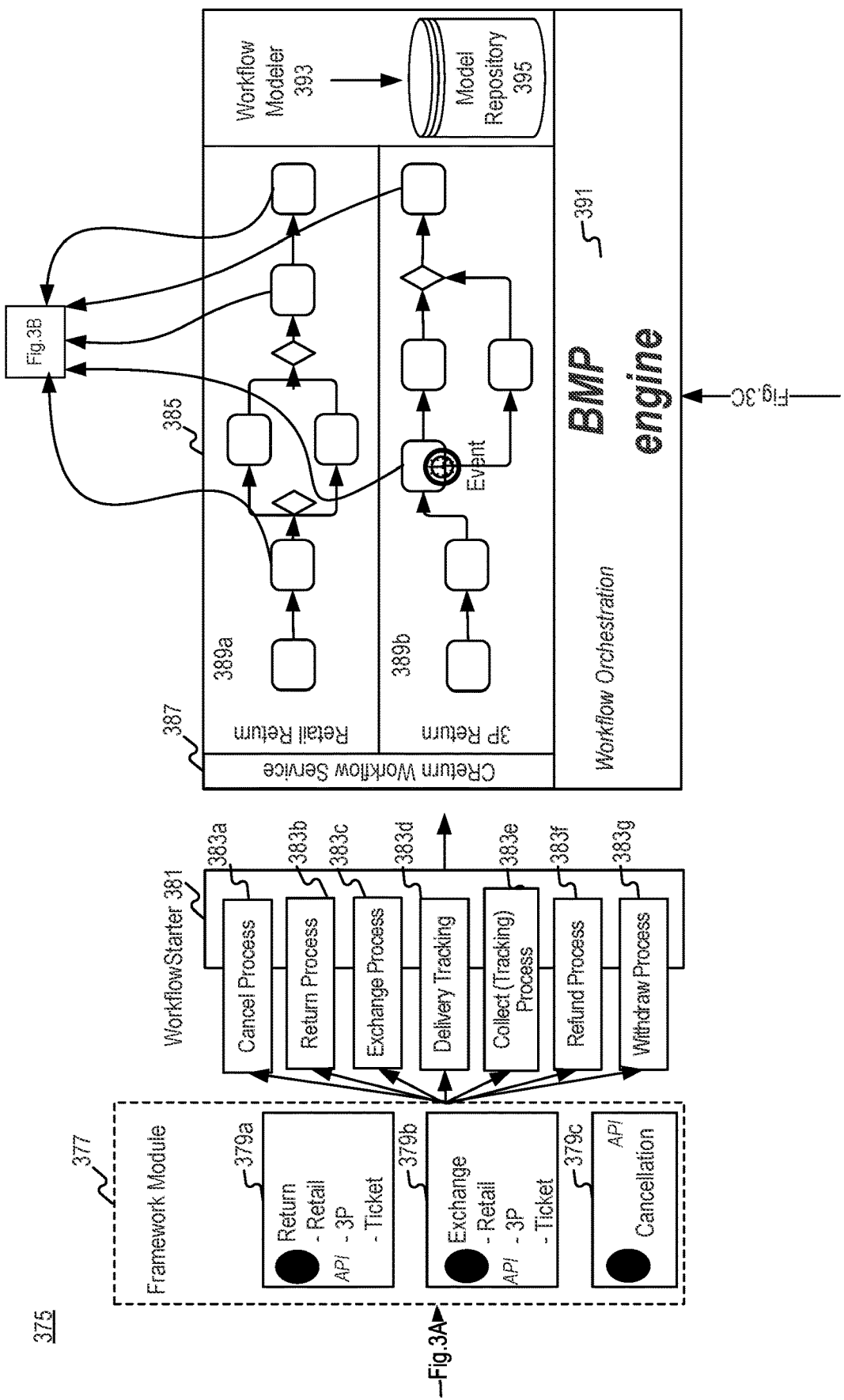
FIG. 3D illustrates an exemplary pictographic representation of a workflow sub-system, consistent with disclosed embodiments.

Output sub-system 325 may include a number of Creturns Domains module 327, which may be communicably coupled to workflow sub-system 375 in FIG. 3D. In some embodiments, Creturns Domains module 327 may comprise a variety of services 329a-d. Examples of services as illustrated on FIG. 3B may include CancelService 329a, ReturnService 329b, ExchangeService 329c, and/or ConcessionsService 329d. Each of the services 329a-d may be responsible for processing output from the respective workflow tasks in workflow sub-system 375 in FIG. 3D. For example, cancel process workflow 383a in FIG. 3D may pass an output to CancelService 329a, while return process workflow 383b in FIG. 3D may pass an output to ReturnService 329b. Architecture of Creturns Domains module 327 be modified to add additional services as needed.

Creturns Domains module 327 may pass processed information to external data sources 370 in FIG. 3C, logging and tracing with logging & tracing module 314 in FIG. 3A and/or external service proxy module 331. Information passed to external data sources 370 is stored as described in section with reference to FIG. 3C. Information passed to logging & tracing module 314 is logged and processed as described earlier in section with reference to FIG. 3A.

External service proxy module 331, which is a part of output sub-system 325, may receive processed output from Creturns Domains module 327 for further direction to an appropriate external service 339a-339e. Output sub-system 325 may use external service proxy module 331 to connect repeatedly to the same service without the expenditure of time and computing resources required for initializing a service proxy more than once. External service proxy module 331 may be implemented as a software or a hardware system between Creturns Domains module 327 and external services 339a-339e. External service proxy module 331 may exist on the same machine as output sub-system 325 or on a separate server. External service proxy module 331 may be specifically configured for use by a consumer, an administrator, and/or a seller. External service proxy module 331 may be implemented on a computing device having a processor, memory component, and/or communications component.

External service proxy module 331 may also include an external service worker 333, which may receive data directly from the Creturn WorkflowStarter 381 in FIG. 3D and may be communicably coupled to workflow sub-system 375 in FIG. 3D. External service worker 333 may exist within an external service proxy module 331, or may exist as a separate component, such as a server, to which an external service proxy module 331 may be connected. External service worker 333 may include various components (e.g., modules, devices, processors, etc.) configured to carry out output processing. For example, external service worker 333 may process data that is not processed by the Creturns Domains module 327.

External service proxy module 331 may also include an external API requester 335, to which external service worker 333 may be communicably coupled. External API requester 335 may be part of external service proxy module 331, or may be a separate device or component, such as a server or a virtual instance. In some embodiments, external service proxy module 331 may have a direct communication to external API requester 335 based on which of the external services 339a-e is required to pass the output to, which may have been determined by Creturns Domains module 327 or external service worker 333. For example, if external service required an API for communication, external API requester 335 may request appropriate API information to establish a connection with the required external service. In some embodiments, external API requester 335 may be configured to re-format, split, parse, tag, and/or otherwise re-configure or transmit information from the communication based on at least one rule or algorithm used by the external service.

External service proxy module 331 may also include a Producer 337, to which external service worker 333 may be communicably coupled. Producer 337 may be part of external service proxy module 331, or may be a separate device or component, such as a server or a virtual instance. Producer 337 is used to publish messages to topics. Topics may be divided into a number of partitions, which contain messages. Each message in a partition is assigned and identified by its unique offset. The message itself contains information about what topic and partition to publish to so data can be published to different topics with the same producer. In some embodiments, Producer 337 may be implemented using Kafka.

External service proxy module 331 may pass processed information to logging & tracing module 314 in FIG. 3A and/or external services 339a-e. Information passed to logging & tracing module 314 is logged and processed as described earlier in in section with reference to FIG. 3A. External services 339a-e initiate actions based on the requests. Examples of services as illustrated on FIG. 3B may include OrderService 339a, FulfillmentService 339b, ShipmentService 329c, BenefitService 339d and/or TicketService 339e. Each of the services 329a-d may be responsible for initiation of specific actions. For example, in the event, workflow sub-system 375 in FIG. 3D passes an output for ExchangeService 329c processing, it may initiate a number of external services. Exchange of an item may involve an output to OrderService 339a to order (order instruction may include instruction to buy an item from a supplier, inform a picker to prepare the item, purchase the item online, go to a 3$^{rd}$ party store and pick it up, or other instructions directed to acquiring an item) a new item, output to ShipmentService 339c to generate a return shipping label, and/or an output to FulfillmentService 339b to process returned item. Architecture of output sub-system 325 may be modified to add additional external services as needed.

FIG. 3C illustrates a pictographic representation 355 of an exemplary control sub-system 350, an exemplary returns eventstore 361, an exemplary rule engine 362, and exemplary external data sources 370, consistent with disclosed embodiments.

Control sub-system 350 may be configured to create, update, maintain, and/or manage data used by various components of system 300 in FIG. 3A, 325 in FIG. 3B, and 375 in FIG. 3D. For example, control sub-system 350 may be configured to create, update, and/or modify parameters for managing returns by consumers (e.g., rules for approving and rejecting a return by a consumer), managing workflows for processing returns, and/or storing specific return events.

As illustrated in FIG. 3C, control sub-system 350 may include a rule management module 351, an event management module 352, and a workflow Management module 353.

Rule management module 351 may be configured to manage rules for processing returns by consumers. For example, rule management module 351 may be configured to create and/or modify a rule for declining a return request by a consumer. By way of example, rule management module 351 may be configured to create and/or modify a rule for declining a return request by a consumer based on various parameters, including, for example, the data relating to the consumer's previous return(s), the monetary amount involved in the return request, the type of the goods to be returned, etc. For example, rule management module 351 may create a rule for declining a return request by a consumer if the consumer returned an empty (or partially empty) box for a return within a predetermined number of days in the past (e.g., 180 days), which may indicate the consumer may have attempted to defraud the system.

In some embodiments, rule management module 351 may be configured to create and/or modify a rule based on input by the user of control sub-system 350. For example, rule management module 351 may receive input from the user for modifying one or more parameters of a rule for validating return requests and modifying the parameter(s) of the rule accordingly.

Event management module 352 may be configured to create, modify, and/or manage events stored in returns eventstore 361. For example, event management module 352 may create a series of events for a return request initiated by a consumer or the system and store the events into returns eventstore 361. By way of example, a consumer may initiate a return of an order via a user device associated with the consumer. Event management module 352 may create an event of receiving the return request and store the event in returns eventstore 361. In some embodiments, an event may include information relating to the return, the consumer, and the order associated with the return. For example, event management module 352 may create a first event for a return requested by a consumer, which may include the information of the return request, the time stamp of receiving the return request, the information relating to the consumer, or the like, or a combination thereof. Event management module 352 may create a second event when one or more items subject to the return are received from the consumer, which may include the information relating to the item(s) received (e.g., the quantity, condition, etc.), the time stamp of receiving the item(s), etc. Event management module 352 may also store the first and second event as a series of events relating to the return in returns eventstore 361.

In some embodiments, returns eventstore 361 may include, for example, Oracle™ databases, Sybase™ databases, or other relational databases or non-relational databases, such as Hadoop™ sequence files, HBase™, or Cassandra™ Returns eventstore 361 may include NoSQL databases such as HBase, MongoDB™ or Cassandra™. Alternatively, database 320 may include relational databases such as Oracle, MySQL and Microsoft SQL Server. In some embodiments, returns eventstore 361 may take the form of servers, general purpose computers, mainframe computers, or any combination of these components.

Workflow management module 353 may be configured to create, modify, and/or manage workflows used by various components of system 300 in FIG. 3A, 325 in FIG. 3B, and 375 in FIG. 3D. For example, workflow management module 353 may be configured to create, modify, and/or manage cancel process 383a, return process 383b, exchange process 383c, delivery tracking 383d, collect process 383e, refund process 383f, and withdraw process 383g used by workflow sub-system 375 (illustrated in FIG. 3D).

In some embodiments, control sub-system 350 may be configured to create, modify, and/or manage services used by Creturns Domains module 327 (illustrated in FIG. 3B). For example, control sub-system 350 may be configured to create, modify, and/or manage CancelService 329a, ReturnService 329b, ExchangeService 329c, and/or ConcessionsService 329d. Creturns Domains module 327 may obtain one or more services from control sub-system 350.

Rule engine 362 may be configured to obtain rules for processing returns from control sub-system 350, and store and/or manage the rules for other components of the workflow sub-system 375 in FIG. 3D. For example, the workflow sub-system 375 in FIG. 3D may be configured to obtain the rules for validating return requests from rule engine 362. In some embodiments, rule engine 362 may include a rule database 363 for storing the rules for managing and/or processing returns.

External data sources 370 may be configured to store data for various components of system including subsystems 300 in FIG. 3A, 325 in FIG. 3B, and 375 in FIG. 3D. For example, external data sources 370 may store various services created and/or updated by control sub-system 350, including, for example, CancelService 329a, ReturnService 329b, ExchangeService 329c, and/or ConcessionsService 329d. Creturns Domains module 327 may obtain one or more services from external data sources 370.

As another example, external data sources 370 may include an eventstore 371 configured to store data relating to events (e.g., return events). In some embodiments, eventstore 371 may include a write database 372 configured to write data in response to write commands. Eventstore may also include one or more read databases 373 (e.g., read database 373A, read database 373B, etc.) configured to read data only in response to query commands. In some embodiments, a read database 373 may include data that are the same as the data included in write database 372. For example, if the data stored in write database 372 are updated in response to a write command, the corresponding data in read database 373 may be updated accordingly such that write database 373 and read database 373 may include the same data. In some embodiments, external data sources 370 may include an admin database 374 configured to store administration data for control sub-system 350.

In some embodiments, eventstore 371 and/or admin database 374 may include, for example, Oracle™ databases, Sybase™ databases, or other relational databases or non-relational databases, such as Hadoop™ sequence files, HBase™, or Cassandra™. Eventstore 371 and/or admin database 374 may include NoSQL databases such as HBase, MongoDB™ or Cassandra™. Alternatively, database 320 may include relational databases such as Oracle, MySQL and Microsoft SQL Server. In some embodiments, eventstore 371 and/or admin database 374 may take the form of servers, general purpose computers, mainframe computers, or any combination of these components.

FIG. 3D illustrates an exemplary pictographic representation of a workflow sub-system 375. Workflow sub-system 375 may be designated for processing output of the intake sub-system 300. Workflow sub-system 375 may pass Validator 308 output to output sub-system 325. Workflow sub-system 375 may be specifically configured for use by a consumer, a delivery-person, an administrator, and/or a seller. Workflow sub-system 375 may be implemented on a computing device having a processor, memory component, and/or communications component. In some embodiments, workflow sub-system 375 and/or components of workflow sub-system 375 may be communicably coupled to other sub-systems (e.g., as described in FIGS. 3A-3D).

Workflow sub-system 375 may include a framework module 377. Framework module 377 may utilize Spring WebFlux or similar technology. Framework module 377 may provide for a non-blocking web stack to handle concurrency with a small number of threads and scale with fewer hardware resources. Framework module 377 may include a variety of programming modules. Examples of modules as illustrated in FIG. 3D may include return module 379a, exchange module 379b, and cancellation module 379c. Modules 379a-c may contain processing logic for retail, third party, and ticket offers. Modules 379a-c may also include an API for communication with sub-systems responsible for respective data.

Workflow sub-system 375 may also include a WorkflowStarter 381, which may be communicatively coupled to framework module 377. WorkflowStarter 381 may include a list of processes 383a-g, which may initiate workflows based on the input received from the framework module 377. Examples of processes as illustrated in FIG. 3D may include cancel process 383a (containing instructions for starting a workflow initiated by the cancellation of an order by the consumer, supplier, or other order handler), return process 383b (containing instructions for starting a workflow initiated by the complete or partial order return by the consumer, supplier, or other order handler), exchange process 383c (containing instructions for starting a workflow initiated by an exchange of complete or partial order started by the consumer, supplier, or other order handler), delivery tracking 383d (containing instructions for starting a workflow initiated by the request to track delivery status of a complete or partial order by the consumer, supplier, or other order handler), collect process 383e (containing instructions for starting a workflow initiated by the request for tracking information of a complete or partial order by the consumer, supplier, or other order handler), refund process 383f (containing instructions for starting a workflow initiated by a request for refund for a complete or partial order started by the consumer, supplier, or other order handler), and withdraw process 383g (containing instructions for starting a workflow initiated by a withdrawal of complete or partial order started by the consumer, supplier, or other order handler).

Workflow sub-system 375 may also include a workflow modeler 393 and a model repository 395. Workflow modeler 393 may create or modify workflows based on user input. Examples of workflow are shown further on to FIG. 5-23. Workflow modeler 393 may also verify if the flow of the tasks is properly defined within the workflow by communicating with Creturn Domains 327 and BPM engine 391 to capture any errors that may occur while one of Creturn Domains modules 329a-d are executing a workflow. Selection on which module is engaged may be based on the configuration of BPM engine 391. During execution/runtime, workflow modeler 393 communicates with BPM engine 391 to determine whether Creturn Domains 327 that are used in executing each task are connected and if there are any errors. Additionally, Workflow Starter 381 may receive a copy of an error message and an input value using the BPM engine 391 and pass it to the user. After workflow is verified it may be stored in model repository 395 for future access by workflow sub-system 375, e.g. for execution or additional modifications consistent with the disclosure.

Furthermore, each of the programing modules 379a-c of framework module 377 may initiate a plurality of processes 383a-g. For example, cancellation module 379c may initiate delivery tracking process 383d to determine if the item that is being canceled was deliver or is still in possession of the delivery personnel. Same cancellation module 379c may also initiate refund process 383f for issuing a refund to the consumer.

Various combinations may be programmed and may be specifically configured for use by a consumer, a delivery-person, an administrator, and/or a seller. WorkflowStarter 381 may be implemented on a computing device having a processor, memory component, and/or communications component. In some embodiments, WorkflowStarter 381 and/or components of WorkflowStarter 381 may be communicably coupled to other parts of workflow sub-system 375 (e.g., as described in FIG. 3D). Furthermore, architecture of workflow sub-system 375 be modified to add additional processes and programing modules as needed.

Workflow sub-system 375 may also include a workflow service module 385, which may be communicably coupled to WorkflowStarter 381 and output sub-system 325. Workflow service module 385 may be designated for workflow control and design. Workflow service module 385 may include a Creturn workflow service module 387 and a workflow orchestration module 391. Workflow service module 385 may provide output for processing by output sub-system 325.

Creturn workflow service module 387 may include a number of sub-modules 389a-b which may control workflows based on the input received from the WorkflowStarter 381. Examples of processes as illustrated in FIG. 3D may include retail return sub-module 389a, which allows for design and/or control of the workflows for the return of retail items and third party return sub-module 389b, which allows for design and/or control of the workflows for the return of third party items. Architecture of Creturn workflow service module 387 be modified to add additional sub-modules as needed. Workflows within Creturn workflow service module 387 may be controlled, and/or designed by a consumer, a delivery-person, an administrator, and/or a seller. Creturn workflow service module 387 may be implemented on a computing device having a processor, memory component, and/or communications component and may be communicably coupled to other parts of workflow sub-system 375.

Workflow orchestration module 391 may include a set of workflow controls which may be accessed by a consumer, a delivery-person, an administrator, and/or a seller. Workflow orchestration module 391 may be implemented with a business process management (BPM) engine and supporting frameworks, one example of which may be Activiti with Spring Boot/Docker. A workflow orchestration module 391 engine has as core goal to take a process definition comprised of human tasks and service calls and execute those in a certain order, while exposing various API's to start, manage and query data about process instances for that definition. Workflow orchestration module 391 may be implemented on a computing device having a processor, memory component, and/or communications component. Workflow orchestration module 391 may be communicably coupled to other parts of workflow sub-system 375.

Figure 4:
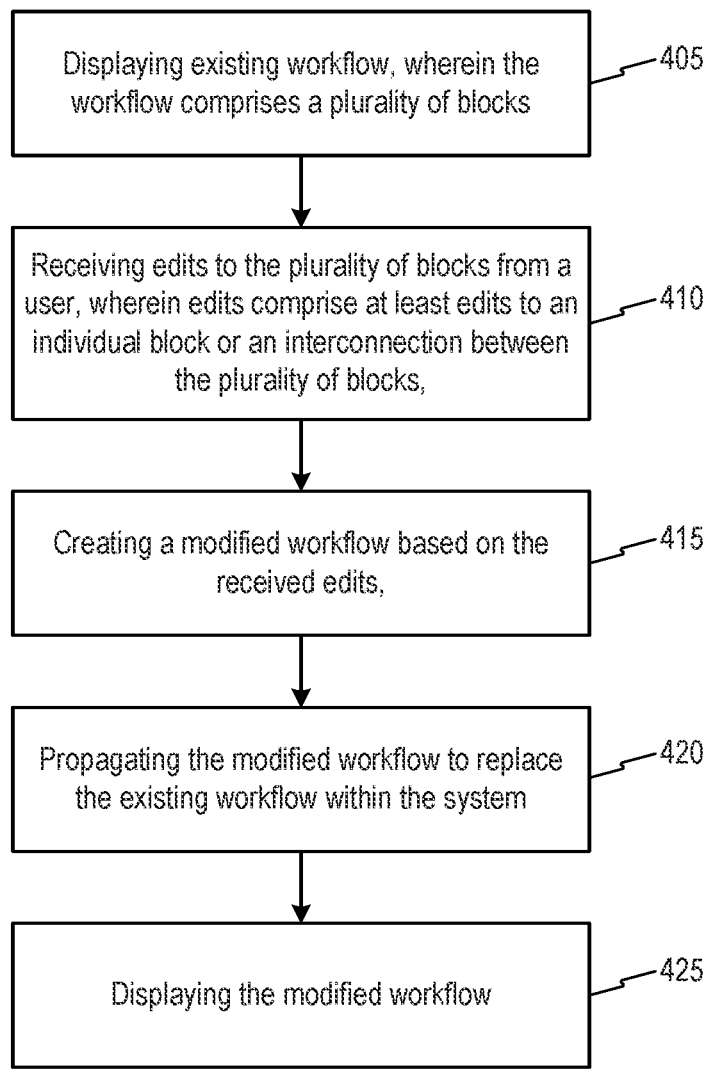
FIG. 4 depicts a flowchart of an exemplary process for workflow editing, consistent with disclosed embodiments.

FIG. 4 depicts a flowchart of an exemplary process 400 for workflow editing, which may be performed by a workflow sub-system 375, in accordance with disclosed embodiments. For example, process 400 may be performed entirely or in part by workflow sub-system 375 (e.g., using Creturn workflow service module 387). Alternatively or additionally, some steps of process 400 may be performed by end devices 107A-C, 119A-C, or any other devices associated with systems depicted on FIG. 1A. Other steps may be performed by another device, such as external computing devices 102A-B. While process 400 is described with respect to workflow sub-system 375, one of skill will understand that the steps illustrated in FIG. 4 are exemplary and steps may be added, merged, divided, duplicated, repeated, modified, and/or deleted in some embodiments.

At step 405, workflow sub-system 375 may display an existing workflow for one of the processes on any of the devices associated with system 100. Processes may be any process with an associated workflow. By the way of example, fulfilment center 200 as depicted in FIG. 2, may have processes associated with workflows for order cancellation, return, exchange, tracking, collection, refunds, withdrawal, or any other processes related to processing and fulfilment of orders. Workflows may include a plurality of interconnected instruction blocks (also may be referred to as building blocks, or simply blocks). Workflows associated with order cancellation may include workflows for complete or partial order cancellation FIG. 5, post cancellation FIG. 6, cancellation approval FIG. 7, stop release after cancellation FIG. 8, or any other workflows associated with order cancellation. Workflows associated with order returns may include workflows for complete or partial order returns FIG. 9, post return processing FIG. 10, return approval FIG. 11, or any other workflow associated with order return. Workflows associated with exchanges may include workflows for complete or partial order exchanges FIG. 12, post exchange processing FIG. 13, unshipped exchange processing FIG. 14, or any other workflows associated with order exchange. Workflows associated with tracking and collection may include workflows for tracking and collection of partial or complete orders FIG. 15A-B, delivery tracking FIG. 16, collection reattempts FIG. 17, collection completion FIG. 18, or any other workflows associated with tracking or collection of an order. Workflows associated with refunds may include workflows for partial or complete refunds FIG. 19, refund completion FIG. 20, or any other workflows associated with refund processing. Workflows associated with withdrawals may include workflows for withdrawing cancellation FIG. 21, withdrawing return FIG. 22, withdrawing exchange FIG. 23, or any other workflows for process withdrawal. Workflows associated with this disclosure are intended to cover any process where a workflow may be used and may need to be edited in any context for any reason. Furthermore, consistent with earlier disclosure each workflow may include a plurality of interconnected instruction blocks. Instruction blocks may include pre-coded instruction for implementing simple steps and may serve as building blocks for the workflows. Instruction blocks are interconnected to form a workflow, there is always a clear start that may be initiated by a WorkflowStarter 381 and an end which would terminate the workflow.

At step 410, workflow sub-system 375 may receive edits to the workflow from a user of one of the systems depicted on FIG. 1, where workflow edits comprise edits to individual blocks and their interconnections. Edits may be input in a codeless manner by manipulating various blocks of the displayed workflow. For example, in some embodiments, a user may manipulate blocks by dragging and dropping the blocks using a mouse, a touchscreen, or any other suitable user interface. End users may add, remove, or otherwise modify workflow blocks and interconnection between them for any reason. For example, in context of cancellation workflow FIG. 5, one instruction block may be used for determination whether the cancellation is for a physical product or for a digital product. End users that sell both physical and digital goods may use this particular block to enhance cancellation processing workflow as cancellation of physical good differs from nullification of digital goods. While end users who only sell one type of goods might opt to use a simpler and faster workflow with less steps as they would not need to determine type of good before processing a cancellation. Similarly, end users may change interconnections to meet needs of different departments. For example, in the context of cancellation workflow FIG. 5, some users may opt to record statistics before wrapping up cancellation request while others may first wrap up the cancellation request and only then record statistics. In one aspect, a ticket sales statistic is more important as it may alert a venue that concert should be cancelled all together, while in physical goods sales, a cancellation request is more important as a physical item may be stopped before it leaves fulfillment facility if caught on time.

At step 415, workflow sub-system 375 may create a modified workflow based on the received edits. At this step, any changes made by the user via code-less interface may be verified for consistency and transformed for system use consistent with earlier disclosure with relation to FIG. 3D. Workflow sub-system 375 may prompt the user if errors are found; in some embodiments, errors may be in the form of looped logic, endless workflows, or any other improper modification or interconnection of blocks. Transformed edits may be shown as a modified workflow.

At step 420, workflow sub-system 375 may propagate the modified workflow across the system, propagation may be limited to a certain department if so desired. In some embodiments, workflow modeler 393 may manage changes to the workflow; users can utilize the latest workflow based on permissions assigned by workflow modeler 393. Permissions may include read, write, execute, or combination thereof. Propagation is performed by the workflow sub-system 375 by keeping workflows with certain department linked together, so regardless of each user makes a change all users with the department will have most up to date copy.

At step 425, workflow sub-system 375 may display modified workflow for additional edits. Modified workflow may be displayed on GUI of devices 107A-C, 119A-C, or any other devices associated with systems depicted on FIG. 1A.

As discussed further in this disclosure with relation to FIG. 5-23 blocks refer to collections of instructions prerecorded for users to build workflows from which may be executed by systems depicted in FIGS. 1 and 3 A-D. Interconnections between block may be edited by dragging and dropping the blocks using a mouse, a touchscreen, or any other suitable user interface. Instructions contained within each block may also be modified to apply to various scenarios, e.g. using input from different sources. Workflows depicted on FIGS. 5-23 are provided as examples and each block and interconnection may be moved or modified by end user to fit specific use case. Modified workflows may be further edited by dragging and dropping the blocks using a mouse, a touchscreen, or any other suitable user interface.

Figure 5:
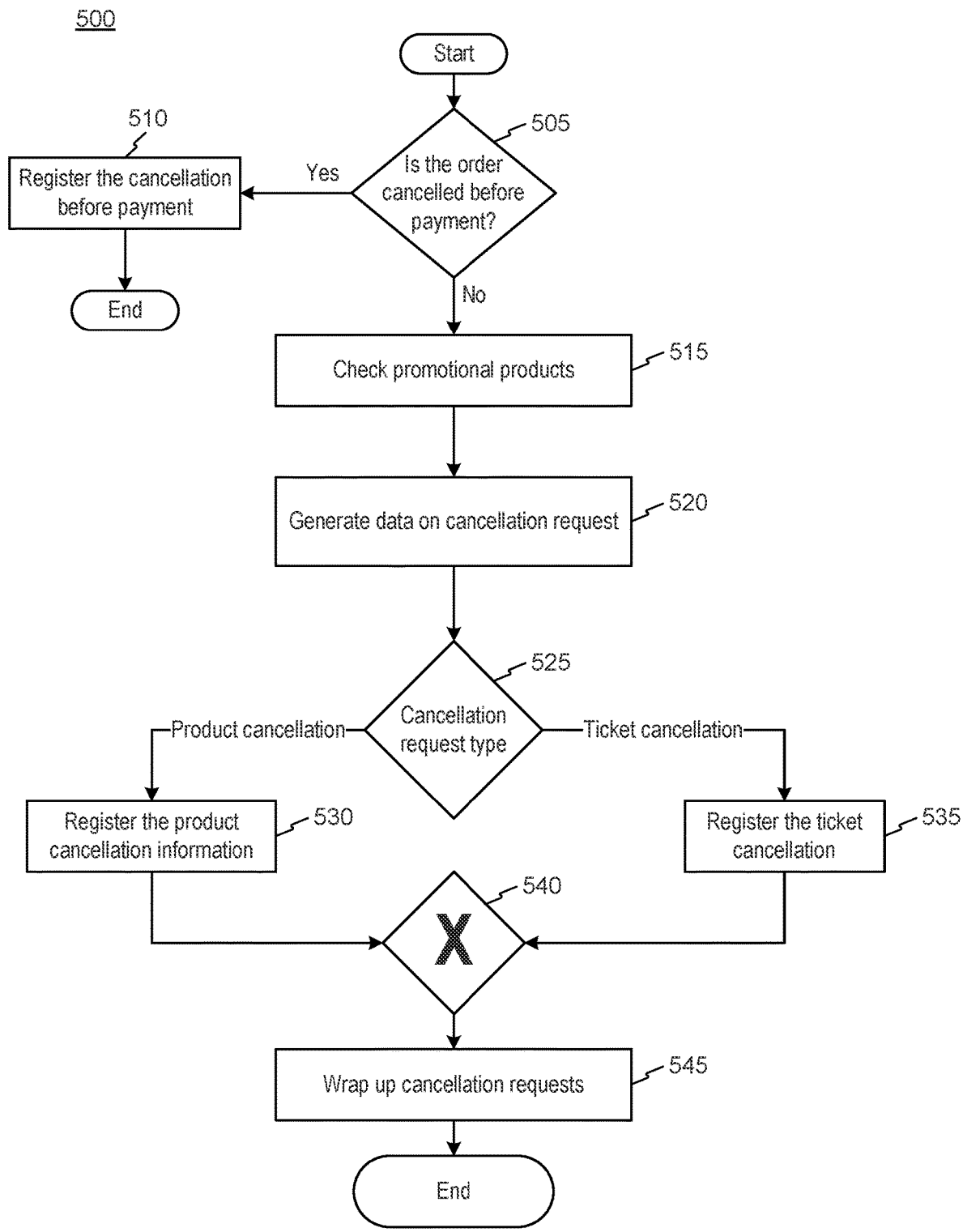
FIG. 5 illustrates exemplary arrangements of blocks which comprise cancellation workflow, consistent with disclosed embodiments.

FIG. 5 illustrates exemplary arrangements of blocks which comprise cancellation workflow 500. Cancellation workflow 500 may include plurality of building blocks 510-545. Additional blocks may be added to the workflow, existing blocks may be removed or position of the blocks may be changed by the user. In the exemplary arrangement cancellation workflow 500 begins with a determination whether an order is cancelled before payment is processed 505. Determination may be performed by the workflow sub-system 375 by communicating with rule engine 362 which may obtain determination from control sub-system 350 consistent with earlier disclosure.

If workflow sub-system 375 determines that the payment was not made, cancellation workflow 500 may proceed to registering cancellation before payment block 510. Registering cancellation before payment block 510 may contain instruction blocks in itself. Instructions within block 510 may include collecting information related to the cancellation, approving the cancellation, and sending notification to the user. Notification may be sent via any suitable communication method, such as email, text message, or any other preferred method. Consistent with the earlier disclosure registering cancellation before payment block 510 may be itself modified by the user.

If workflow sub-system 375 determines that the payment was made cancellation workflow 500 may proceed to determining whether a promotion applies to the order 515. Determination is made by the workflow sub-system 375 and may rely on communication with other systems as shown on FIG. 3A-D. Promotion, as used herein, may refer to additional items sent to the consumer (e.g., buy one get one free, free samples, free service), discounts, rebates or other benefits provided with a purchase of an item that is being canceled. Workflow sub-system 375 may determine whether a promotion applies to the order block 515 by communicating with other systems as shown on FIG. 3A-D and may initiate additional workflows to cancel items bundled with the canceled item or any other instruction required to properly process promotional products. Consistent with the earlier disclosure block 515 may be itself modified by the user.

After workflow sub-system 375 determination whether a promotion applies to the order 515, cancellation workflow 500 may proceed to generating data for the cancellation request block 520. Block 520 may generate a report including all data associated with the cancellation that may be used for further processing. Generation may be performed by the workflow sub-system 375 and may rely on communication with other systems as shown on FIGS. 3A-D. Generated data may be passed to block 525 for determining cancellation request type.

Block 525 relates to determining by workflow sub-system 375 whether the cancellation is a product cancellation or a ticket cancellation. Ticket, as used herein, refers to an admission ticket for an event. Determination may rely on data generated in block 520 and be performed by the workflow sub-system 375 and may rely on communication with other systems as shown on FIG. 3A-D. In the event workflow sub-system 375 determines that cancellation is a ticket cancellation workflow 500 may proceed to block 535 to register ticket cancellation. Alternatively, it will proceed to block 530 to register product cancellation. Registration blocks 530 and 535 may contain additional instructions to determine whether the cancellation is fault of the consumer, determine whether free return shipping may be offered (If (ordered amount)−(estimated refund amount)<(cost of free shipping), deny free shipping). Consistent with the earlier disclosure blocks 530 and 535 may be modified by the user to include any additional instructions users deems necessary.

After the registration of the cancellation is completed, cancellation workflow 500 may proceed to junction 540. Junction 540 is an example on how a user may modify interconnection between the blocks. On the depicted example user decided to proceed to block 545 regardless of cancellation request type, it is important to note that other users may have chosen to split workflow in two at this stage and continue with separating workflow. Junctions, such as junction 540 allows user to easily modify interconnection of various blocks without a need to understand mechanics or code behind every single instruction with individual blocks.

Following junction 540 cancellation workflow 500 may proceed to block 545 to wrap up cancellation request. Wrapping up cancellation request, as used herein, may refer to conclusory tasks in the workflow. Conclusory tasks may include reporting, storing, confirming the request. Additionally, it may include storing a snapshot of the estimated refund amount, for transfer to a payment system.

Figure 6:
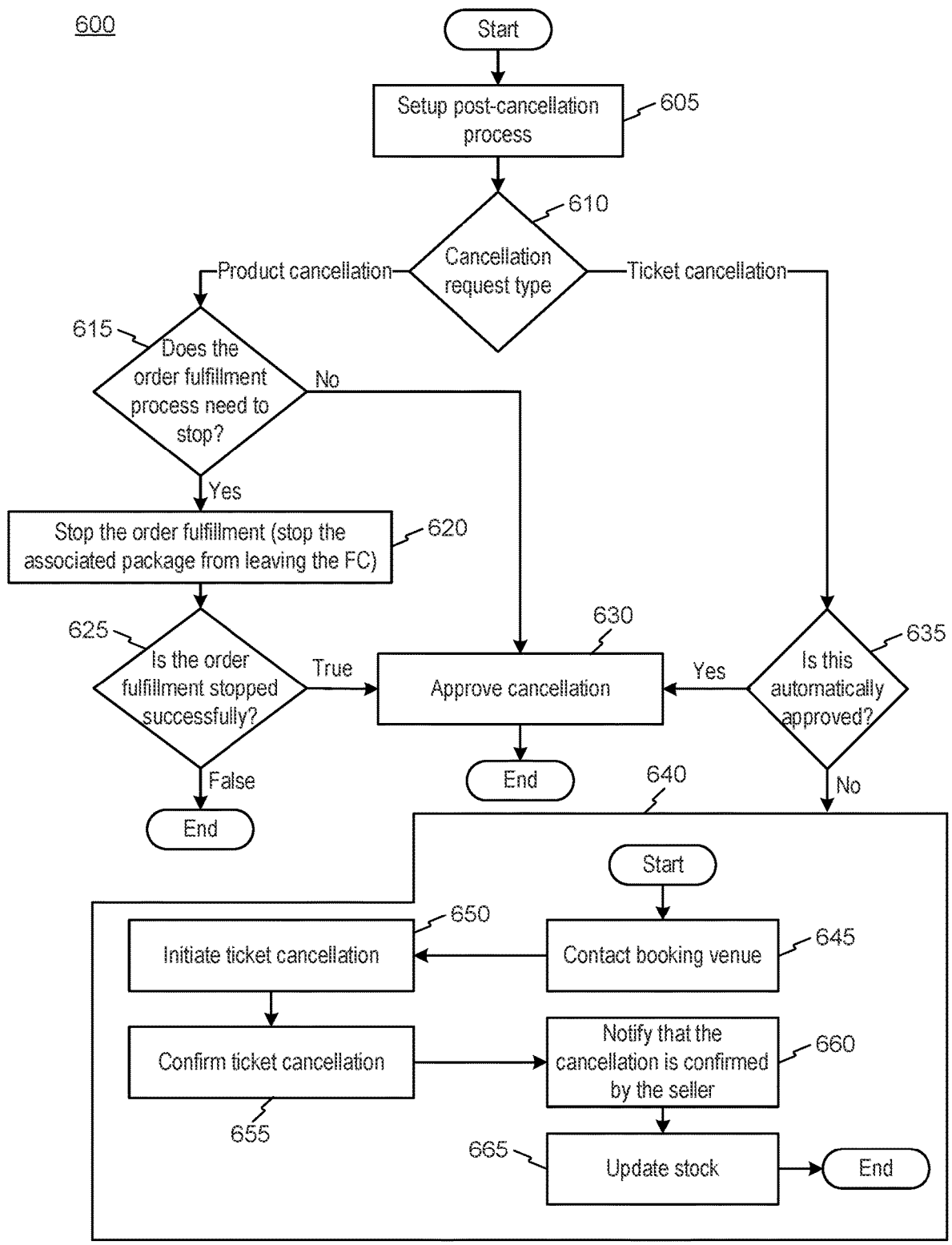
FIG. 6 illustrates exemplary arrangements of blocks which comprise post cancellation workflow, consistent with disclosed embodiments.

FIG. 6 illustrates exemplary arrangements of blocks which comprise post cancellation workflow 600, consistent with the disclosed embodiments. Post cancellation workflow 600 may be performed by the workflow sub-system 375 and may rely on communication with other systems as shown on FIG. 3A-D. Post cancellation workflow 600 may start at block 605 to setup a post-cancellation process. Setting up post-cancellation process may involve additional instruction blocks which may be used to look up the cancellation request, determine whether the request can be automatically approved, determine whether the order fulfillment should be stopped, preventing the associated package from being shipped out.

Post cancellation workflow 600 may proceed to block 610 for determination whether cancellation is a product cancellation or a ticket cancellation, which, in some embodiments, is the same block that was used and described with relation to cancellation workflow depicted on FIG. 5, block 525.

In the event workflow sub-system 375 determines that cancellation is a product cancellation, workflow 600 may proceed to block 615 to determine whether order fulfilment needs to stop. This may be determined by communicating with other parts of the system as depicted on FIGS. 1 and 3A-D.

If workflow sub-system 375 determines that the order fulfilment indeed need to stop, workflow 600 may proceed to block 620 and attempt to stop the order fulfillment and attempt to stop the associated package from leaving the fulfilment center. Block 620 may include additional instruction for: registering the product cancellation information, determining current fulfillment status of the product, initiating a return workflow, and issuing a refund for the product. Additionally, instructions for generating a stop order for fulfillment and stopping a package with the product from leaving may be included. These instructions may be added or removed by the end used when customizing workflow 600. Following block 625 of the workflow 600 may be used for determining whether the order fulfilment is stopped successfully. In the even the order is not stopped or cannot be stopped workflow 600 ends and order cancellation will not be approved.

If workflow sub-system 375 determines that cancellation is a ticket cancellation, workflow 600 may proceed to block 635 to determine whether ticket cancellation may be automatically approved. Block 635 may rely on communication with $3^{rd}$ party as shown on FIGS. 1 and 3A-D (e.g. booking venue) to make this determination.

If workflow sub-system 375 at block 635 determines that ticket cancellation is automatically approved, or at block 615 determines that order fulfilment process does not need to stop, or at block 625 determines that the order fulfilment was stopped successfully, workflow 600 may proceed to block 630 to approve the cancellation. Cancellation approval block 630 may include reporting, storing, confirming cancellation data, estimating refund amount, or any other approval related instructions. As with all the other blocks within the exemplary workflows FIGS. 5-23 it may be modified by the user based on need of a particular department.

If workflow sub-system 375 at block 635 determines that ticket cancellation is not automatically approved, workflow 600 may initiate workflow 640 to initiate booking cancellation. Booking cancellation workflow 640 may be used as a standalone workflow if, for example, end user only sells tickets. Booking cancellation workflow 640 may be performed by the workflow sub-system 375 and may rely on communication with other systems as shown on FIG. 3A-D.

Booking cancellation workflow 640 may begin at contacting booking venue block 645. Booking venue may be contacted by utilizing external service worker 333 as shown on FIG. 3A-D. After communication is established with the booking venue booking cancellation workflow 640 may proceed to initiating ticket cancellation block 650. Workflow sub-system 375 may initiate ticket cancellation at block 650 and may send required ticket information with cancellation details to the booking venue. Following block 650, workflow 640 may continue with confirming ticket cancellation block 655. External service worker 333 may receive confirmation from the booking venue. External service worker 333 may pass confirmation to workflow sub-system 375 as shown on FIG. 3A-D. Finally, workflow sub-system 375 may nullify sold ticket. After the cancellation is confirmed workflow sub-system 375 may notify the consumer 660, and ticket stock may be updated 665. Booking cancellation workflow 640 may contain additional instructions for: nullifying the event ticket, notifying an event venue, registering the event ticket cancellation, and generating a receipt for the event cancellation which may be modified or implemented within various workflows by the end user.

Figure 7:
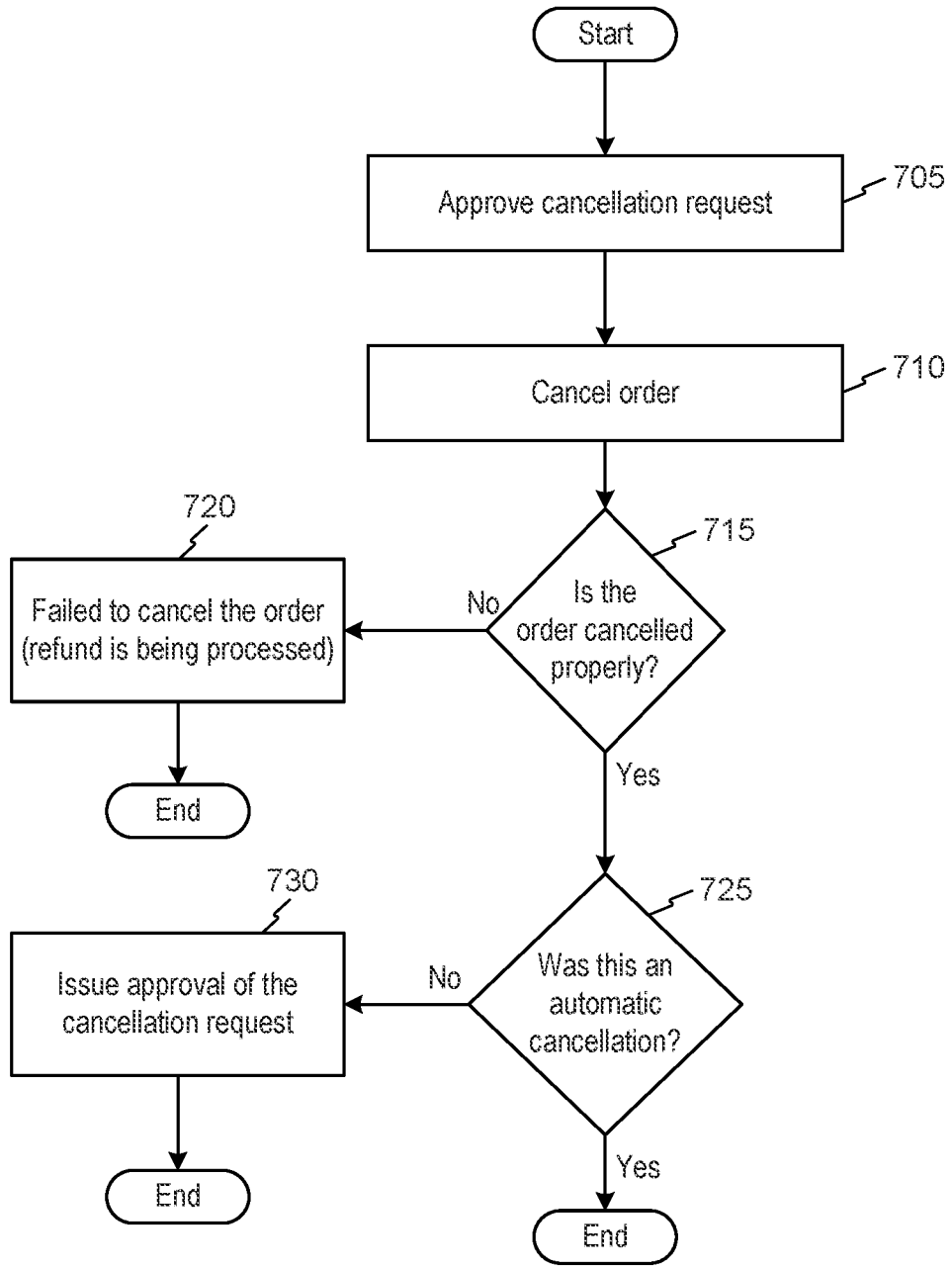
FIG. 7 illustrates exemplary arrangements of blocks which comprise cancellation approval workflow, consistent with disclosed embodiments.

FIG. 7 illustrates exemplary arrangements of blocks which comprise cancellation approval workflow 700. Workflow 700 may be performed by the workflow sub-system 375 and may rely on communication with other systems as shown on FIG. 3A-D. Workflow 700 may begin at approve cancellation request block 705. Approve cancellation request block may run closing procedures on the cancellation request prior to issuing refund such as data verification, client validation, etc. After cancellation request is approved 705, workflow 700 may continue with attempting to cancel the order block 710. Order cancellation may change order status from "P" to "H" (in some embodiments, the order status may include one of P for "Payment", H for "Cancellation in progress", and C for "Cancelled") thereby indicating that the order is being canceled and should not be processed by any other workflows. Order status change may also initiate withdrawal workflows as described later with reference to FIG. 21-23.

Following block 715 may be used to determine whether order is cancelled properly. Properly canceling order, as used herein, may indicate that an order is canceled in its entirety with no errors. Determination may be made by workflow sub-system 375 and may rely on communication with other systems as shown on FIGS. 1 and 3A-D. If workflow sub-system 375 determines that cancellation of the order failed 720 refund may still be processed. Following failed cancellation 720, current workflow 700 may end and additional workflows may be initiated to remedy any errors discovered. Alternatively, if workflow sub-system 375 determines that the order was canceled properly workflow 700 may continue to block 725 to determine whether this was an automatic cancellation. Block 725 is similar to block 635 discussed in reference to FIG. 6 and workflow 600. If the cancellation is automatic workflow 700 ends as no further actions are required. Alternatively, if the cancellation is not automatic prior to ending workflow 700 final cancellation approval is issued 730.

Figure 8:
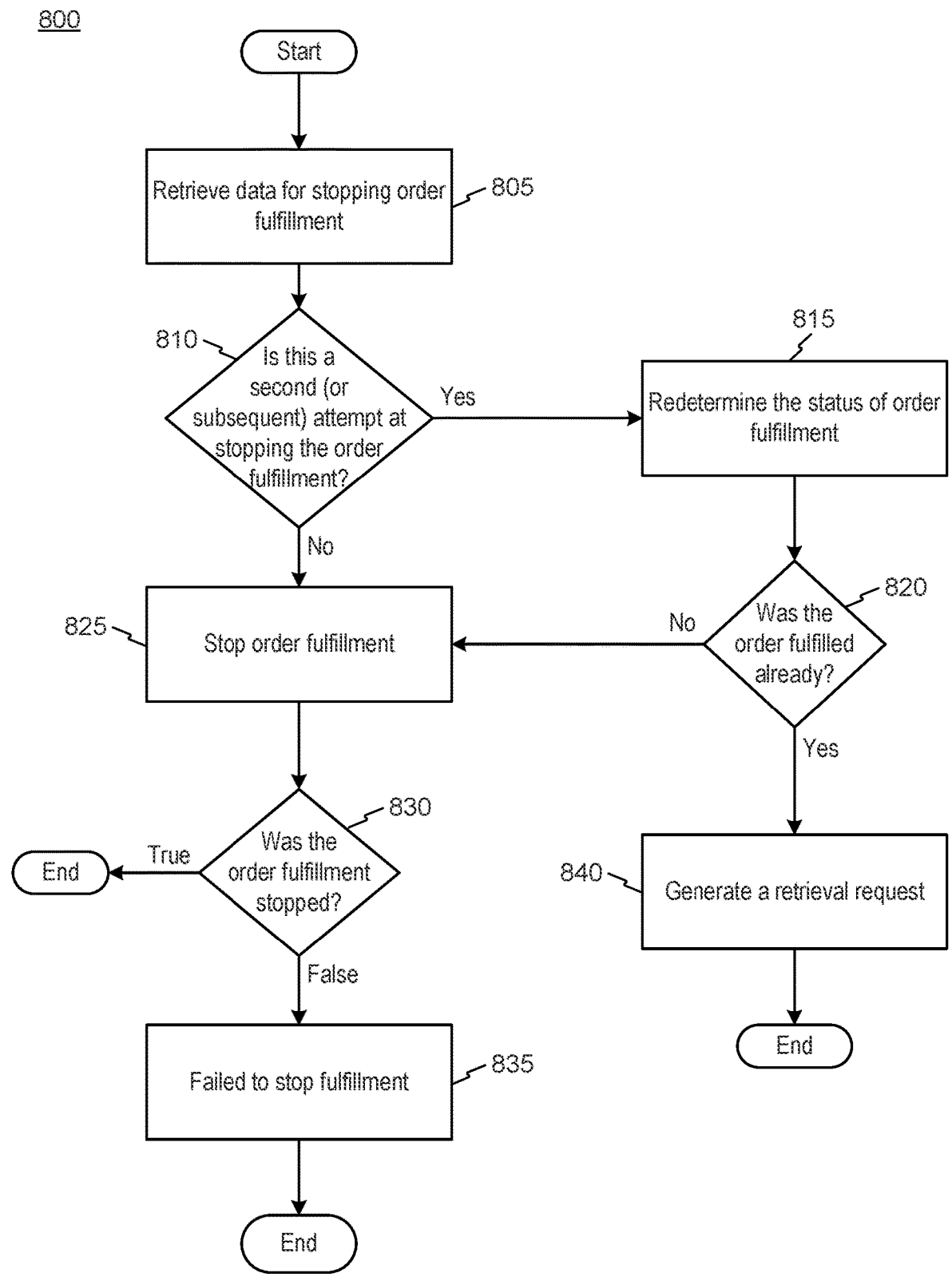
FIG. 8 illustrates exemplary arrangements of blocks which comprise stop-release workflow after a cancellation, consistent with disclosed embodiments.

FIG. 8 illustrates exemplary arrangements of blocks which comprise stop-release workflow after a cancellation, consistent with the disclosed embodiments. Workflow 800 may be performed by the workflow sub-system 375 and may rely on communication with other systems as shown on FIG. 3A-D. Workflow 800 may start at block 805 by retrieving data for stopping order fulfilment. Such data may include itemized order details, fulfilment center information, distribution path, etc. Workflow 800 may continue to block 810 to determine whether an earlier attempt was made to stop order fulfillment. In the event workflow sub-system 375 determines that this is a first attempt workflow 800 may attempt to stop order fulfilment 825. If workflow sub-system 375 determines at the block 830 that the order fulfilment was successfully stopped workflow 800 may end. Alternatively, if order workflow 800 failed to stop fulfilment 835 record of the failure may be stored prior to ending workflow 800. Keeping a record allows for workflow 800 to take a different path in subsequent attempts of stopping order fulfilment.

If workflow sub-system 375 determines that there is a record of earlier failed attempt at stopping fulfilment block 810 will determine that status of the order fulfilment may need to be reevaluated 815. Block 815 may evaluate if the status of order fulfilment has changed since last attempt, e.g. left first warehouse and is currently on its way to second warehouse. Alternatively block 820 may determine that the order was already fulfilled. In this case retrieval request may be generated at block 840 and workflow 800 will end. Generation of a retrieval request may initiate a retrieval workflow which is described in more detail with reference to FIGS. 15-18.

If, however, block 820 determines that the order is not yet fulfilled workflow 800 may loopback to block 825 for a second attempt to stop fulfilment. Workflow 800 may be initiated multiple times until order is either fulfilled or fulfilment is stopped. Number of time workflow 800 is initiated may depend on a number of items in the order and a number of hubs each item visits before it is delivered.

Figure 9:
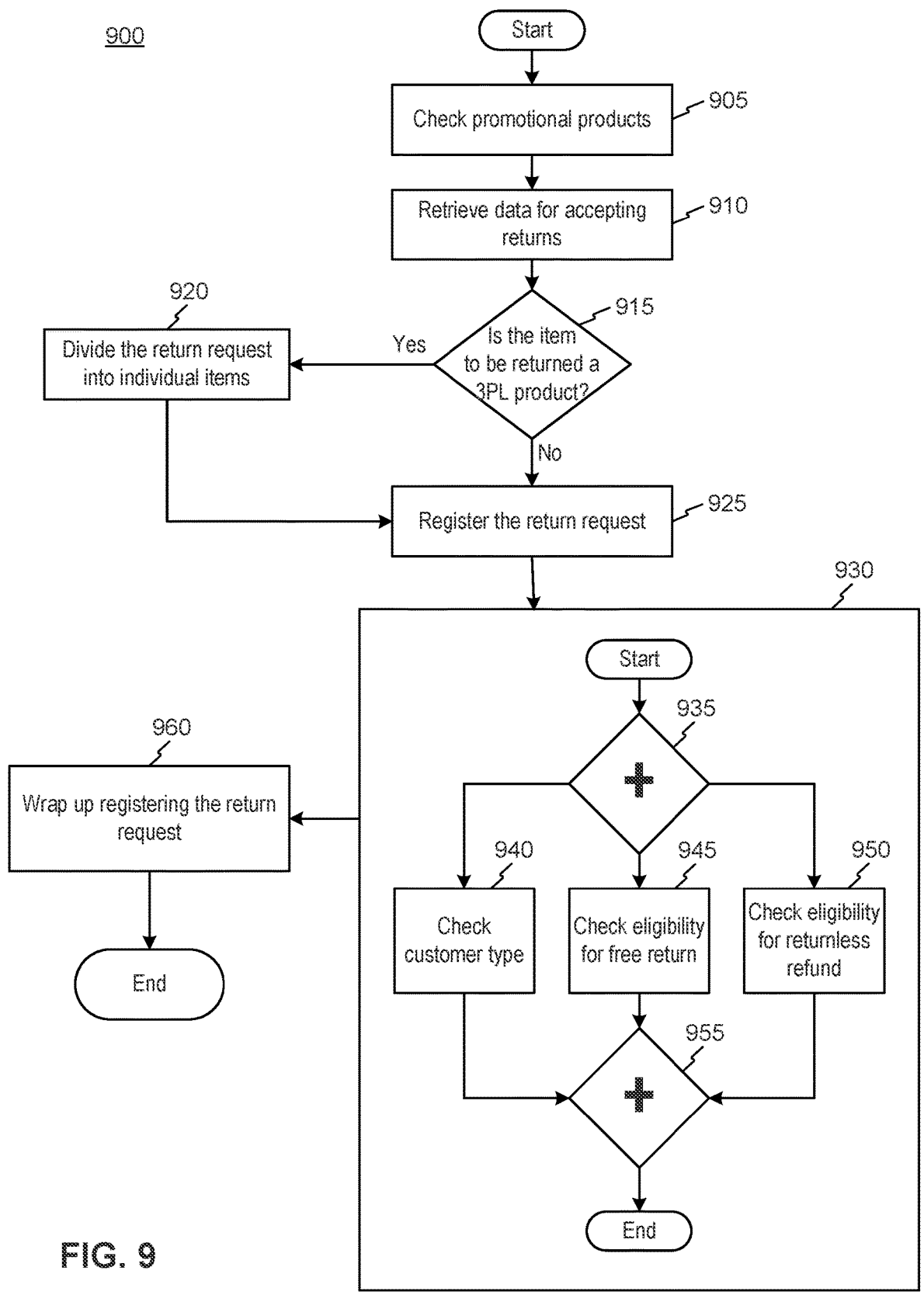
FIG. 9 illustrates exemplary arrangements of blocks which comprise a return workflow, consistent with disclosed embodiments.

FIG. 9 illustrates exemplary arrangements of blocks which comprise a return workflow 900, consistent with the disclosed embodiments. Workflow 900 may be performed by the workflow sub-system 375 and may rely on communication with other systems as shown on FIG. 3A-D. Workflow 900 may begin at block 905 by checking promotional products. Block 905 may be implemented similar to block 515 described earlier with respect to workflow 500 and FIG. 5. Workflow 900 may continue to block 910 to retrieve data for accepting returns. Data for accepting returns may include lists of IDs associated with return-eligible items for each vendor, specify logistic configurations based on the product type, and set IDs for fulfillment status and delivery package. For example, external service proxy 331 may provide: order data "LogisticsType," item data "VendorItem (IDs)", delivery data from system 101, or any other data related to the order. Workflow 900, may follow with block 915 which may determine where returned item is a 3PL product. 3PL product may be handled by $3^{rd}$ party fulfillment (3PL) systems 121A-121C as described earlier with relation to FIG. 1. Block 920 may be implemented to split 3PL product from other products. Block 925 may follow to register return requests. Block 925 may check the validity of the return request data, and if there's invalid data, a return request submission failure exception may occurs which may be captured by the BPM engine (391) as an error and processed consistent with earlier disclosure as described in reference to FIG. 3.

After products return requests are registered by the workflow sub-system 375. Workflow sub-system 375 may initiate supplemental workflow 930 to determine consumer type 940 (e.g., regular member, premium member, VIP member, etc.), verify eligibility for free return 945 (e.g., eligibility may be based on consumer type, order price, etc.), and check eligibility for returnless refund 950. Blocks 940-950 may be performed by workflow sub-system 375 be retrieving data from external data sources 370 as depicted on FIG. 3A-D. Returnless refund, as used herein, refers to a refund where return is not needed, e.g. for digital or perished goods. Workflow 900 ends with block 960 by wrapping up registration of the return request. Wrapping up return request may refer to conclusory tasks in the workflow. Conclusory tasks performed by workflow sub-system 375 may include reporting, storing, confirming the request as shown on FIG. 3 A-D.

Figure 10:
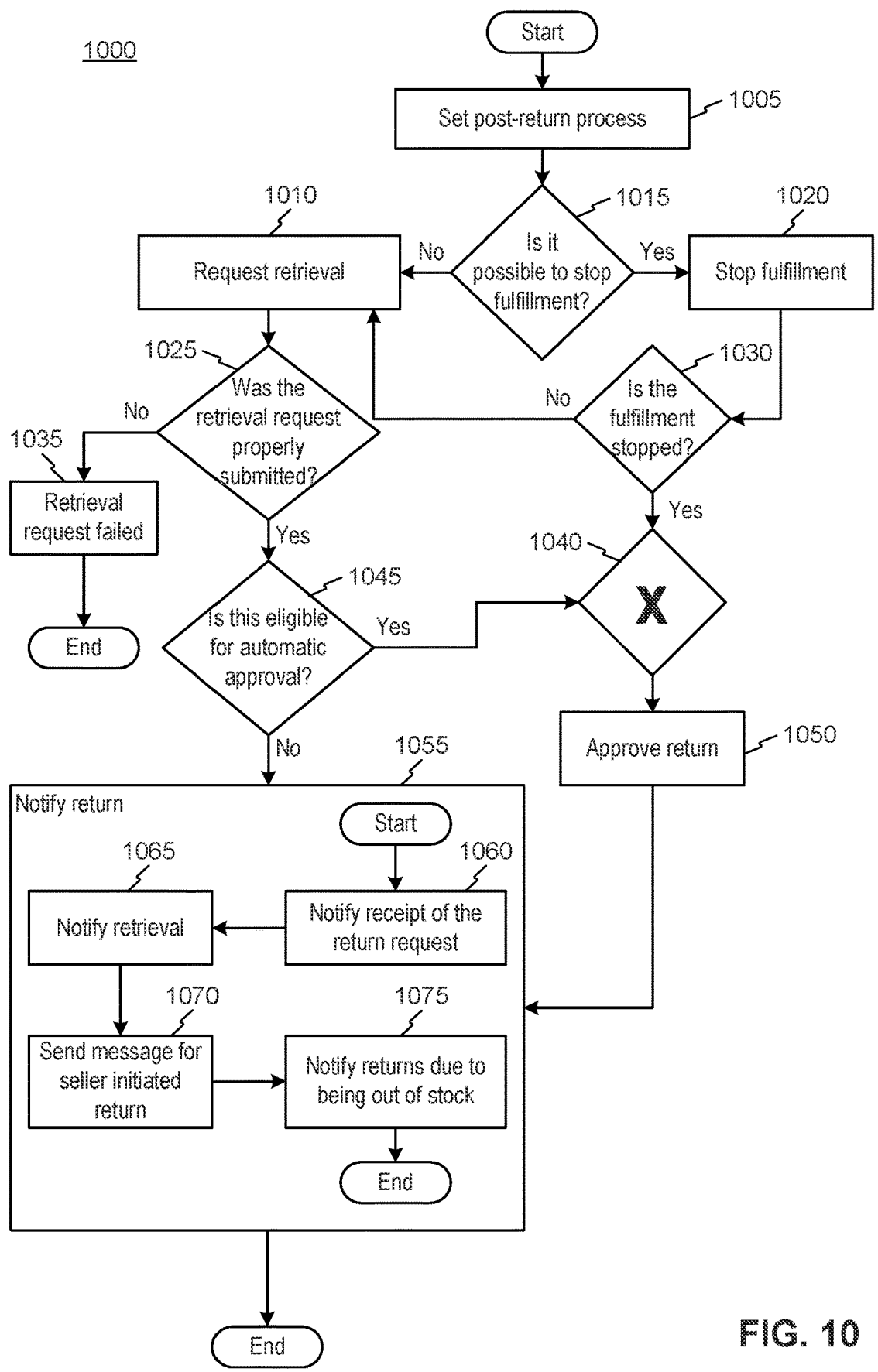
FIG. 10 illustrates exemplary arrangements of blocks which comprise post return process workflow, consistent with disclosed embodiments.

FIG. 10 illustrates exemplary arrangements of blocks which comprise post return process workflow 1000, consistent with the disclosed embodiments. Workflow 1000 may be performed by the workflow sub-system 375 and may rely on communication with other systems as shown on FIG. 3A-D. Workflow 1000 may begin at block 1005 where workflow sub-system 375 sets post return process. Post return, as used herein, refers to processes happening after initial return workflow is complete, e.g. after initial data collection. Setting a process, as used herein, may refer to configuring settings for the request, e.g. setting whether to stop fulfillment, setting whether to approve automatically, setting whether the cancellation was initiated by the seller, etc. Settings may be preset based on the process type and workflow merely updates (sets) the request settings accordingly. Preset settings may be stored in external data sources 370, and workflow sub-system 375 may access it to set request settings according to the presets.

After post return process is set, workflow sub-system 375 may determine whether it is possible to stop fulfillment 1015. If yes, the process continues to block 1020, and the fulfilment is successfully stopped, workflow sub-system 375 may approve return 1050 and end workflow 1000 or initiate notify return workflow 1055. If no, or if fulfilment cannot be stopped, workflow sub-system 375 proceeds to block 1010 which may request retrieval. The process then proceeds to block 1025, at which workflow sub-system 375 attempts to submit a retrieval request to SAT system 101. If retrieval request fails 1035 workflow 1000 may end or be reinitiated.

If the retrieval request is successful ("Yes" branch of block 1025), workflow sub-system 375 may proceeds to block 1045 which may determine whether retrieval request is eligible for automatic approval. Workflow sub-system 375 may make a determination based on items ordered or consumer associated with an order by, for example, retrieving additional information from external data sources 370. If workflow sub-system 375 determines that retrieval is eligible for automatic approval return may be approved at block 1050 and workflow 1000 may end or supplemental notify return workflow 1055 may be initiated.

Supplemental notify return workflow 1055 may be executed by workflow sub-system 375 after block 1050 or after block 1045 if item is not eligible for automatic approval. Workflow 1055 starts at block 1060, where workflow sub-system 375 notifies other systems depicted in FIG. 3A-D of receipt of return request. Further, workflow sub-system 375 may provide notifications of retrieval at block 1065 and send consumer messages with status updates. Before workflow 1055 is completed, workflow sub-system 375 may, as shown by the way of example on FIG. 10, also notify consumers if replacement is out of stock at block 1075.

Figure 11:
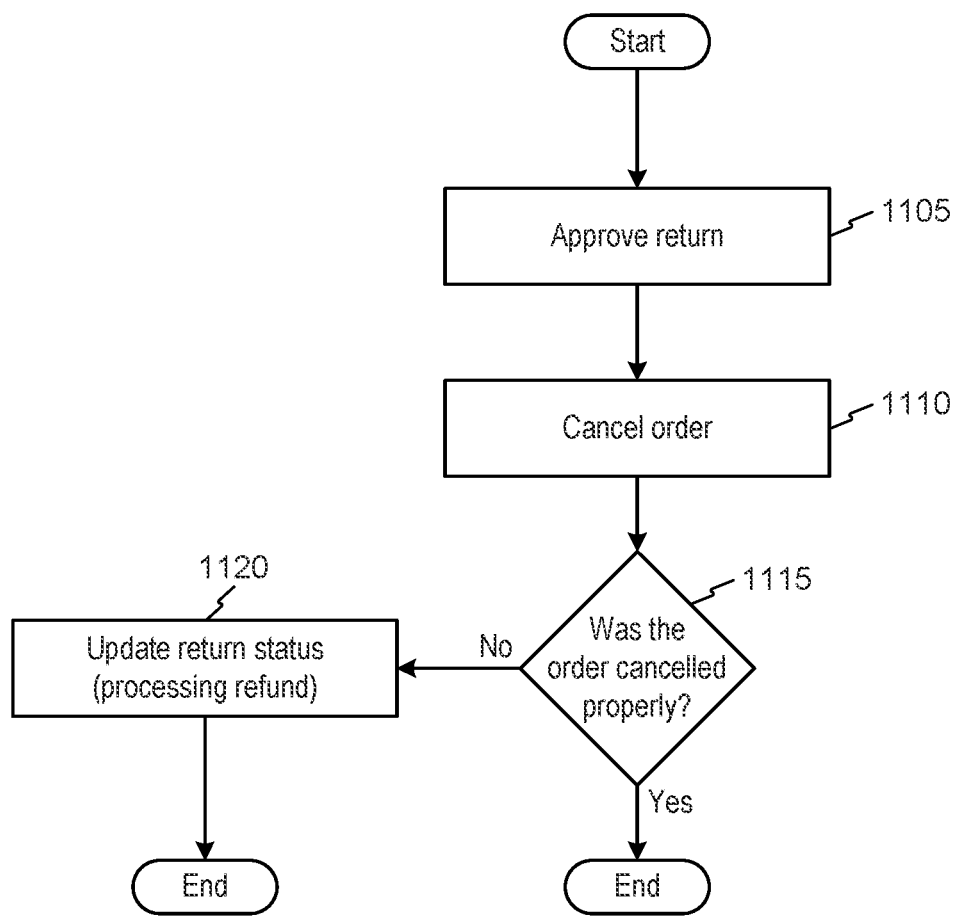
FIG. 11 illustrates exemplary arrangements of blocks which comprise return approval workflow, consistent with disclosed embodiments.

FIG. 11 illustrates exemplary arrangements of blocks which comprise return approval workflow 1100, consistent with the disclosed embodiments. Workflow 1100 may be performed by the workflow sub-system 375 and may rely on communication with other systems as shown on FIG. 3A-D. Workflow 1100 assumes that fulfilment was successfully stopped and begins at block 1105. At block 1105, workflow sub-system 375 may approve return. Block 1105 is similar to block 1050 in workflow 1000 depicted on FIG. 10 and is consistent with earlier disclosure. Once workflow sub-system 375 approves the return in block 1100 it may proceed to cancel an order 1110, this is similar to block 710 in workflow 700 and is consistent with earlier disclosure. Workflow sub-system 375 will determine whether an order was cancelled properly in block 1115, consistent with earlier disclosure and will end workflow 1100 if yes. Otherwise, before ending workflow 1100, workflow sub-system 375 will update return status to "processing refund" in block 1120 which may initiate additional workflows.

Figure 12:
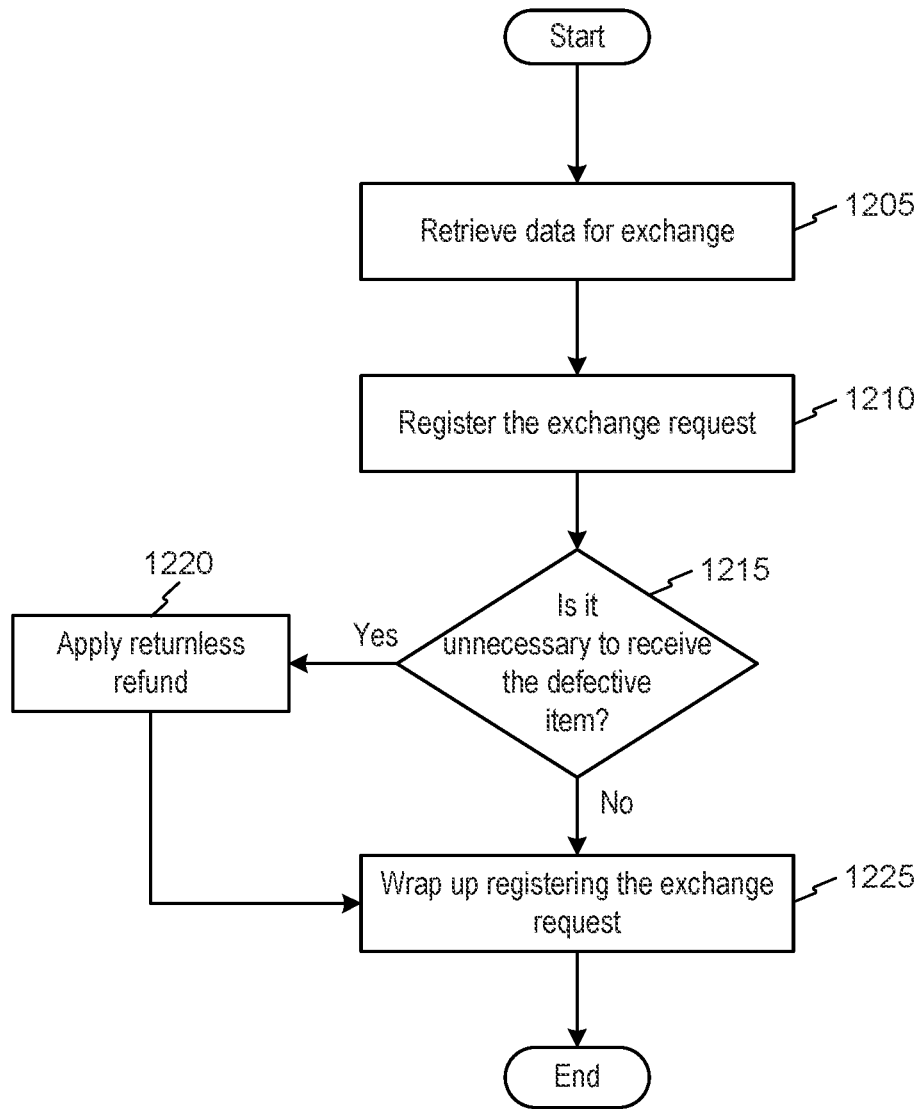
FIG. 12 illustrates exemplary arrangements of blocks which comprise exchange workflow, consistent with disclosed embodiments.

FIG. 12 illustrates exemplary arrangements of blocks which comprise exchange workflow 1200, consistent with the disclosed embodiments. Workflow 1200 may be performed by the workflow sub-system 375 and may rely on communication with other systems as shown on FIG. 3A-D. Workflow 1200 begins by workflow sub-system 375 retrieving data associated with an exchange request at block 1205. Data may be retrieved from external data sources 370 and include any data relevant to exchange process, e.g. time of original order, original price, payment method, consumer address, etc. If data is not available from external data sources 370, workflow sub-system 375 may retrieve data from other systems as depicted on FIG. 3A-D. Workflow sub-system 375 proceeds with registering the exchange request at block 1210 across all interconnected systems as depicted on FIG. 3A-D.

Workflow 1200 continues with workflow sub-system 375 making a determination whether defective item needs to be returned. Workflow sub-system 375 determines whether return is needed at block 1215 by, for example, communicating with return service 329c. If workflow sub-system 375 determines that no return is needed is may apply a return less refund at block 1220. Otherwise exchange request is wrapped up at block 1225 and additional workflows may be called for further processing.

Figure 13:
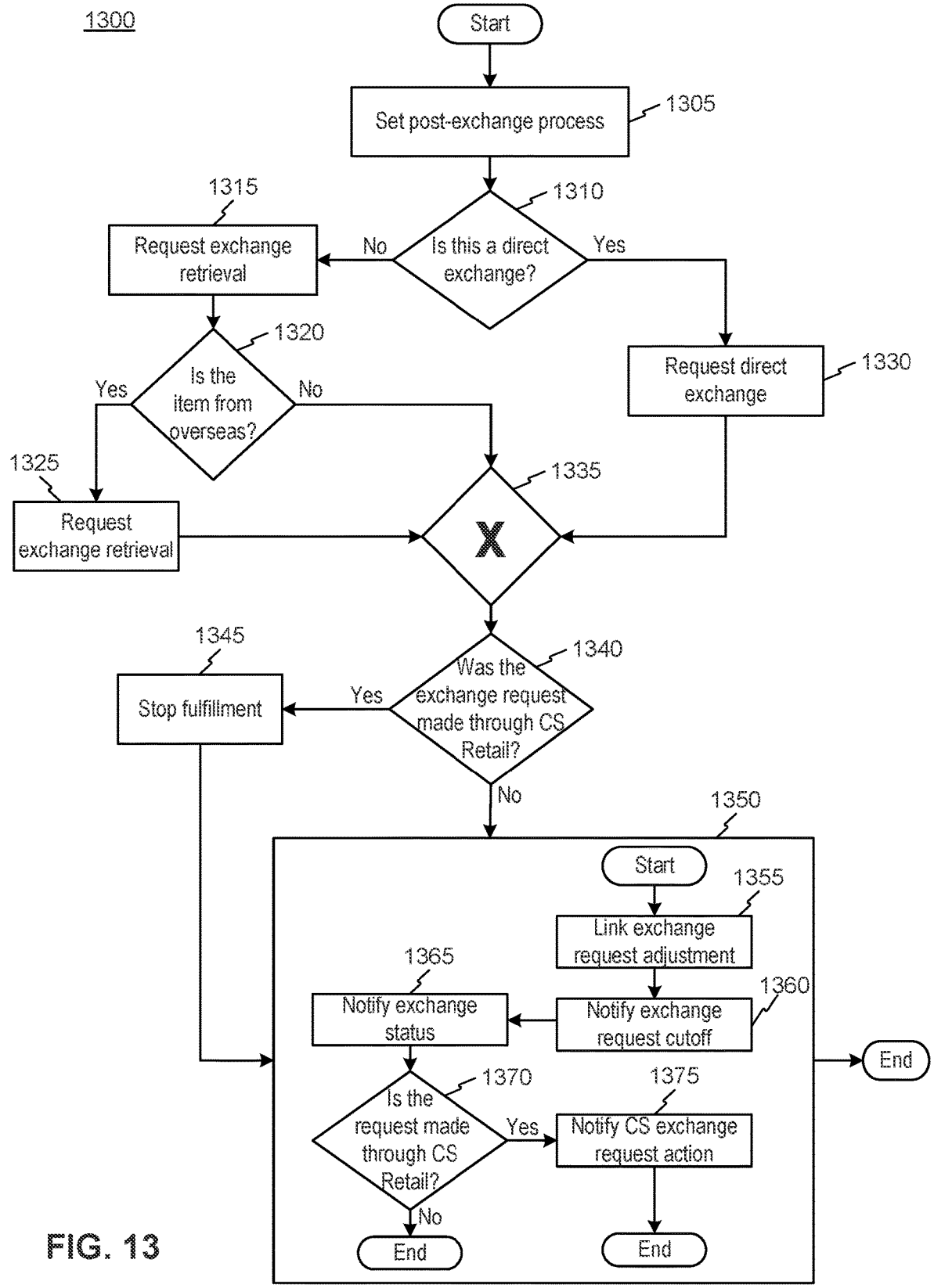
FIG. 13 illustrates exemplary arrangements of blocks which comprise post exchange workflow, consistent with disclosed embodiments.

FIG. 13 illustrates exemplary arrangements of blocks which comprise post exchange workflow 1300, consistent with the disclosed embodiments. Workflow 1300 may be performed by the workflow sub-system 375 and may rely on communication with other systems as shown on FIG. 3A-D. Workflow 1300 begins at block 1305. At block 1305 workflow sub-system 375 sets post exchange process consistent with earlier disclosure. Workflow sub-system 375 then determines whether the exchange is direct in block 1310. Direct exchange, as used herein, may refer to exchanges performed by the system without contacting $3^{rd}$ party or overseas resellers. Determination at block 1310 is made by communicating with other systems depicted on FIG. 3A-D. E.g. workflow sub-system 375 may communicate with external data sources 370, to retrieve information regarding seller of the item, and how exchange should be processed. If the exchange is not direct workflow sub-system 375 will initiate a request exchange retrieval at block 1315 and determine if the item is from overseas at block 1320 by contacting additional systems as illustrated on FIG. 3A-D. Workflow sub-system 375 may update exchange retrieval request at block 1325 if item is determined to be from overseas by, for example, communicating updated information to Creturn domains 327 for further processing.

Workflow 1300 may proceed with block 1340. At block 1340 workflow sub-system 375 may determine whether exchange request was made through retail. Block 1340 activates when: (1) direct exchange is requested at block 1330; (2) a request exchange is retrieved from overseas as determined at block 1320 and retrieval request is updated at block 1325; or (3) request exchange is not retrieved from overseas as determined at block 1320. If workflow sub-system 375 determines at block 1340 that exchange request was made through retail, fulfilment is stopped in block 1345. Workflow sub-system 375 may determine whether exchange request is direct or not by communicating with external data sources 370. At block 1345 in order to stop fulfilment, workflow sub-system 375 may put a request with SAT system 101. Fulfilment may need to be stopped, due to fact that consumer would typically pick up exchange item at the retail location, and fulfilment by the warehouse will be unnecessary Supplemental notify workflow 1350 may be engaged after block 1345 or alternatively if negative determination is made by workflow sub-system 375 at block 1340. Supplemental workflow 1350 starts at block 1355. At block 1355 workflow sub-system 375 may link an adjustment to an exchange request, if for example a more expensive item is ordered as a replacement. Workflow sub-system 375 may notify of exchange cutoff at block 1360, placing a time limit on when exchange may be requested. Workflow sub-system 375 may notify consumer on status of the exchange 1365 which may be done by sending emails or text messages. And if workflow sub-system 375 determines by communicating with external data sources 370 that the request is made through the retailer at block 1370, workflow sub-system 375 may also notify the retailer at block 1375.

Figure 14:
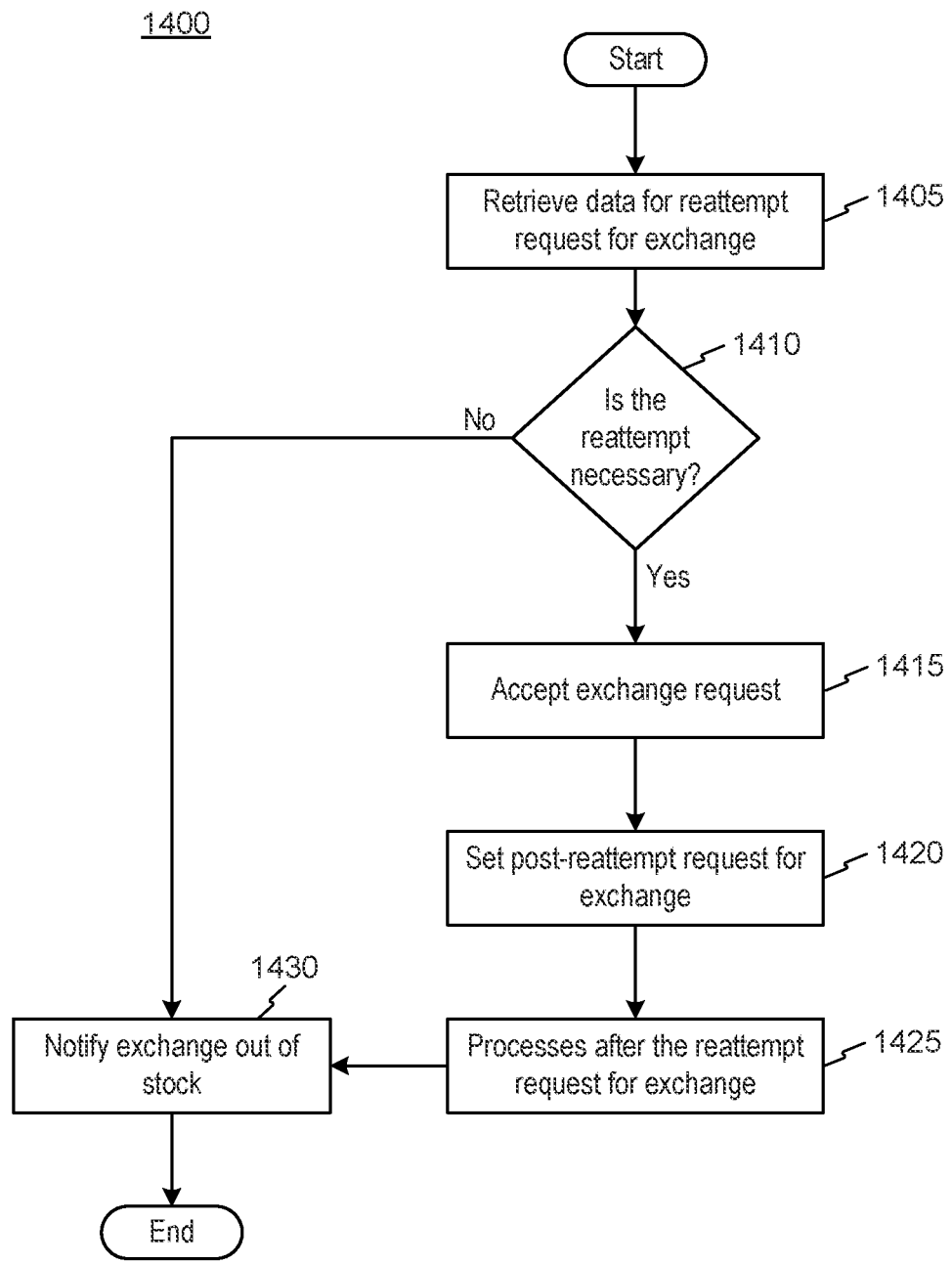
FIG. 14 illustrates exemplary arrangements of blocks which comprise unshipped exchange workflow, consistent with disclosed embodiments.

FIG. 14 illustrates exemplary arrangements of blocks which comprise unshipped exchange workflow 1400, consistent with the disclosed embodiments. Workflow 1400 may be performed by the workflow sub-system 375 and may rely on communication with other systems as shown on FIG. 3A-D. Workflow 1400 begins at block 1405. At block 1405 workflow sub-system 375 retrieves data associated with the exchange request for reattempt request from exchange from other systems as depicted on FIG. 3A-D, e.g., external data sources 370. If workflow sub-system 375 determines that reattempt is not necessary at block 1410, meaning that exchange was successful or canceled, workflow sub-system 375 may notify responsible system that exchange item is out of stock at block 1430. Out of stock, as used herein, may refer to the fact that item left its original position in the fulfillment center and may need to be retrieved to be put back in stock. Otherwise, workflow sub-system 375 will accept exchange request in block 1415 and set post-reattempt request for exchange in block 1420. Post-reattempt exchange, as used herein, refers to processes happening after reattempt is made. Setting a process, as used herein, may refer to configuring settings for the request as described earlier. After workflow sub-system 375 completes all processes after the reattempt at block 1425, workflow sub-system 375 may notify responsible system that exchanged item is out of stock at block 1430.

Figure 15A:
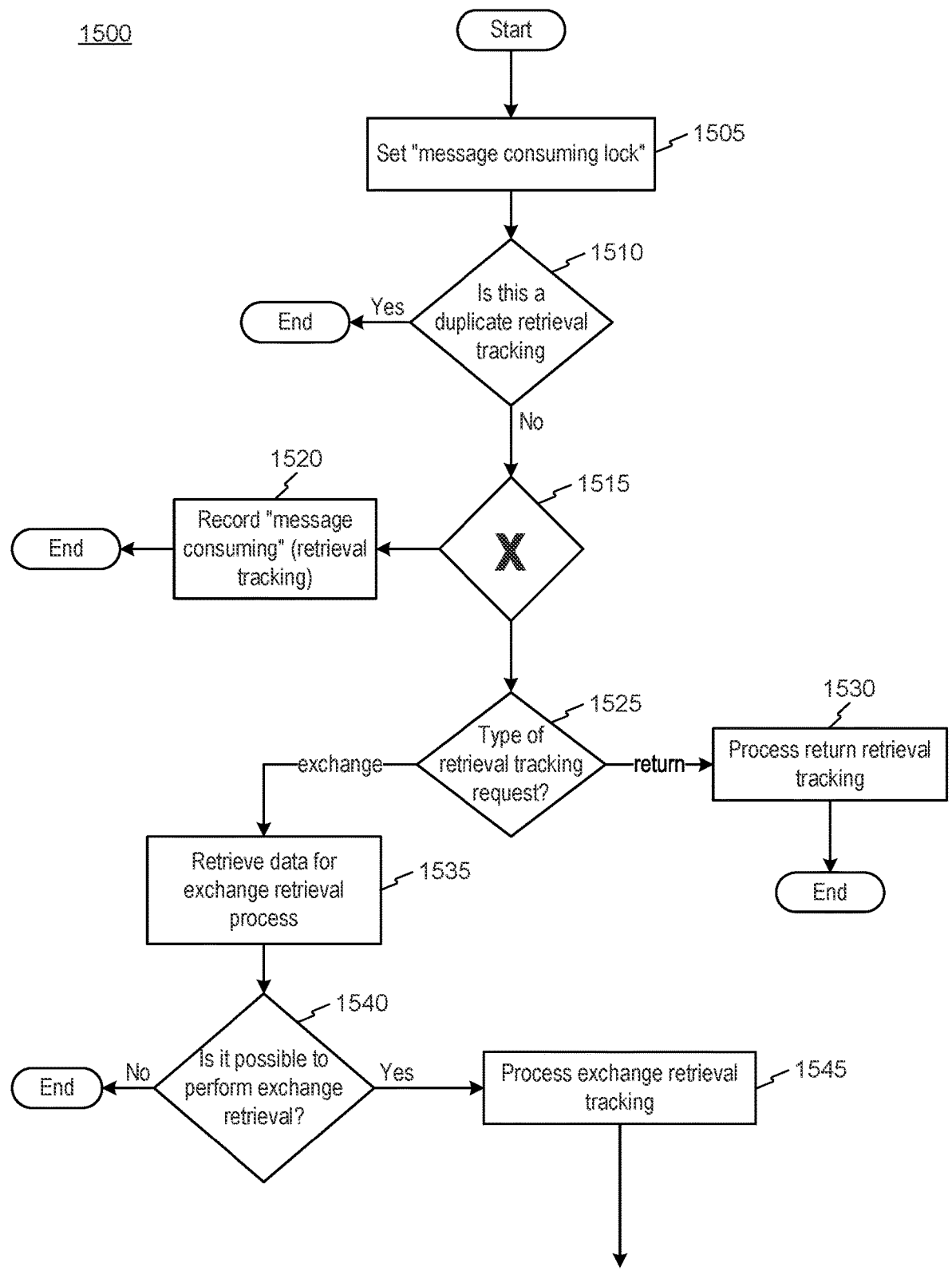
FIGS. 15A and 15B illustrate exemplary arrangements of blocks which comprise tracking collection workflow, consistent with disclosed embodiments.
Figure 15B:
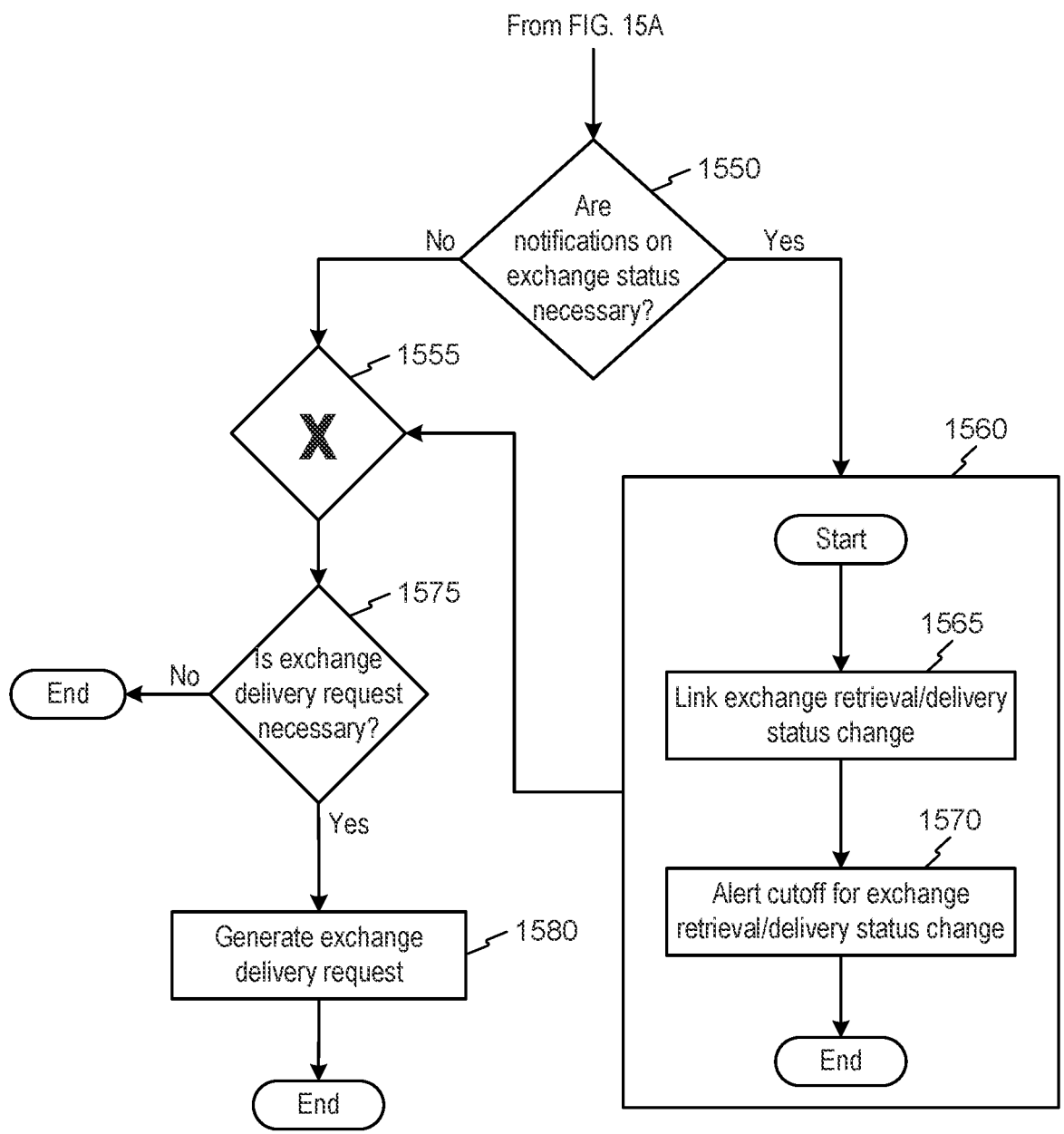

FIGS. 15A and 15B illustrate exemplary arrangements of blocks which comprise tracking collection workflow, consistent with the disclosed embodiments. Workflow 1500 may be performed by the workflow sub-system 375 and may rely on communication with other systems as shown on FIG. 3A-D. Workflow 1500 begins at block 1505. At block 1505 workflow sub-system 375 may set a consuming lock for tracking information retrieval. In the event workflow sub-system 375 determines that it is a duplicate tracking at block, by comparing consuming lock with existing data in e.g., external data sources 370. 1510 workflow 1500 will end. Otherwise, workflow may continue to blocks 1520 and 1525. At block 1520 workflow sub-system 375 may record tracking information and at block 1525 workflow sub-system 375 may determine whether the tracking is related to exchange or return request. Determination may be based on information associated with the tracking in a consuming lock, information may be received from external data sources 370 or other workflows. If retrieval is determined to be for the return request, workflow sub-system 375 may process return tracking at block 1530, consistent with earlier disclosure, and workflow 1500 may end. If workflow sub-system 375 determines that retrieval is for the exchange request workflow sub-system 375 may retrieve additional data at block 1535 from external data sources 370. Further, workflow sub-system 375 determines whether it is possible to perform exchange retrieval 1540 by communicating with SAT system 101 or other systems as shown on FIG. 3A-D. If it is possible workflow sub-system 375 may process exchange tracking in block 1545.

Moving to FIG. 15B, workflow sub-system 375 determines whether notifications on exchange are necessary at block 1550. To make this determination workflow sub-system 375 retrieve required information from external data sources 370. Further, workflow sub-system 375 may link exchange retrieval/delivery status change at block 1565 and alert cutoff for exchange at block 1570. Following block 1570 or negative determination at block 1550, workflow sub-system 375 determines if delivery exchange is necessary 1575, workflow sub-system 375 may generate exchange delivery request 1580. Necessity may be determined by workflow sub-system 375 by communicating with external data sources 370 or other systems as shown on FIGS. 1 and 3 A-D.

Figure 16:
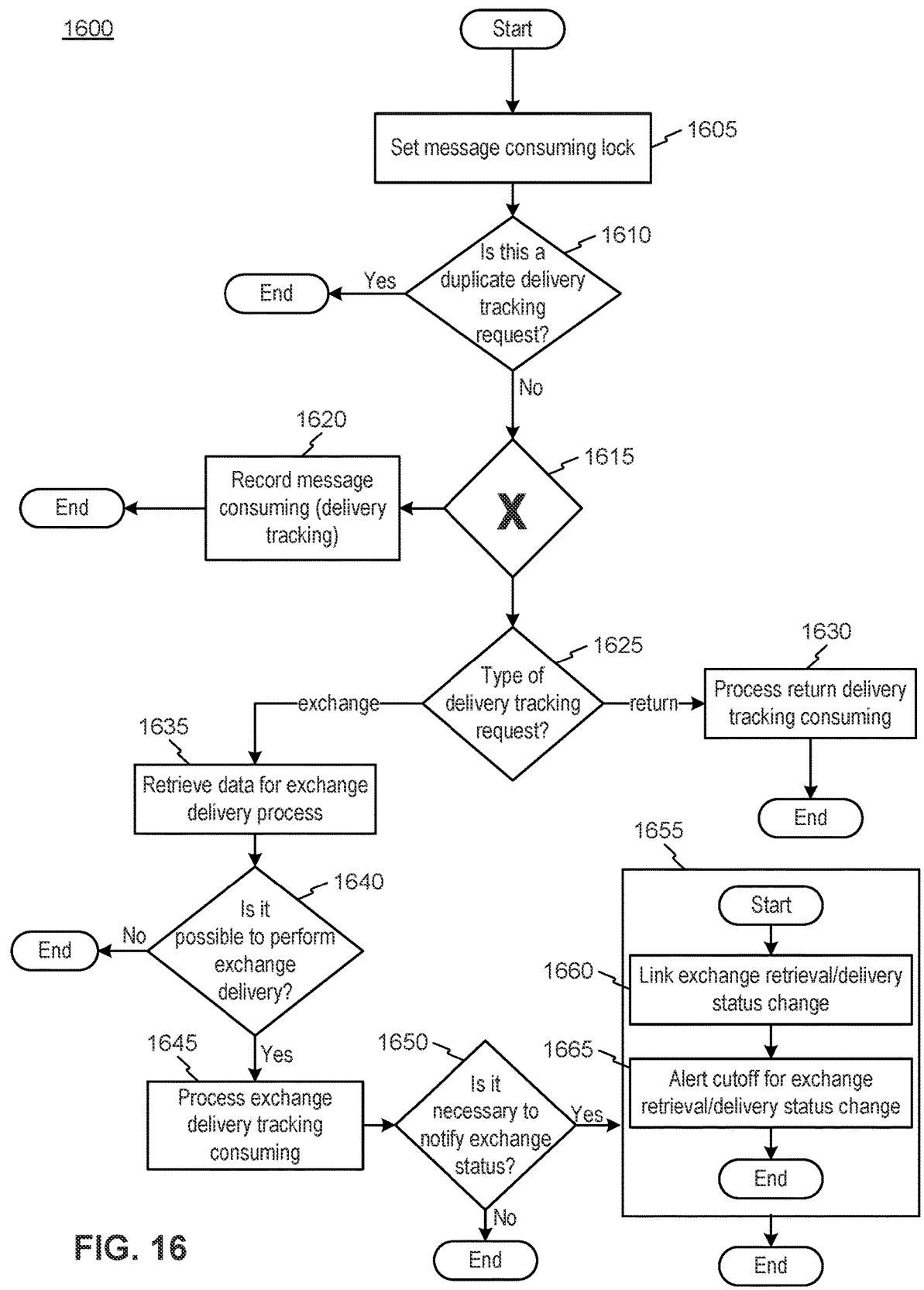
FIG. 16 illustrates exemplary arrangements of blocks which comprise delivery tracking workflow, consistent with disclosed embodiments.

FIG. 16 illustrates exemplary arrangements of blocks which comprise delivery tracking workflow 1600, consistent with the disclosed embodiments. Workflow 1600 may be performed by the workflow sub-system 375 and may rely on communication with other systems as shown on FIG. 3A-D. Workflow 1600 essentially mirrors workflow 1500 by using same building blocks. In workflow 1600, blocks 1605-1650 operate substantially identically to blocks 1505-1550 in FIGS. 15A and 15B (respectively). Supplemental workflow 1655 is also substantially identical to supplemental workflow 1560. Key differences between workflow 1600 and workflow 1500 is that (1) workflow sub-system 375 utilizes delivery tracking and not retrieval tracking in blocks 1610, 1625, 1630, and 1645, and (2) workflow 1600 does not need to verify necessity as does workflow 1500 in blocks 1555, 1575, and 1580. This shows that same building blocks may be utilized by different systems to achieve different goals.

Figure 17:
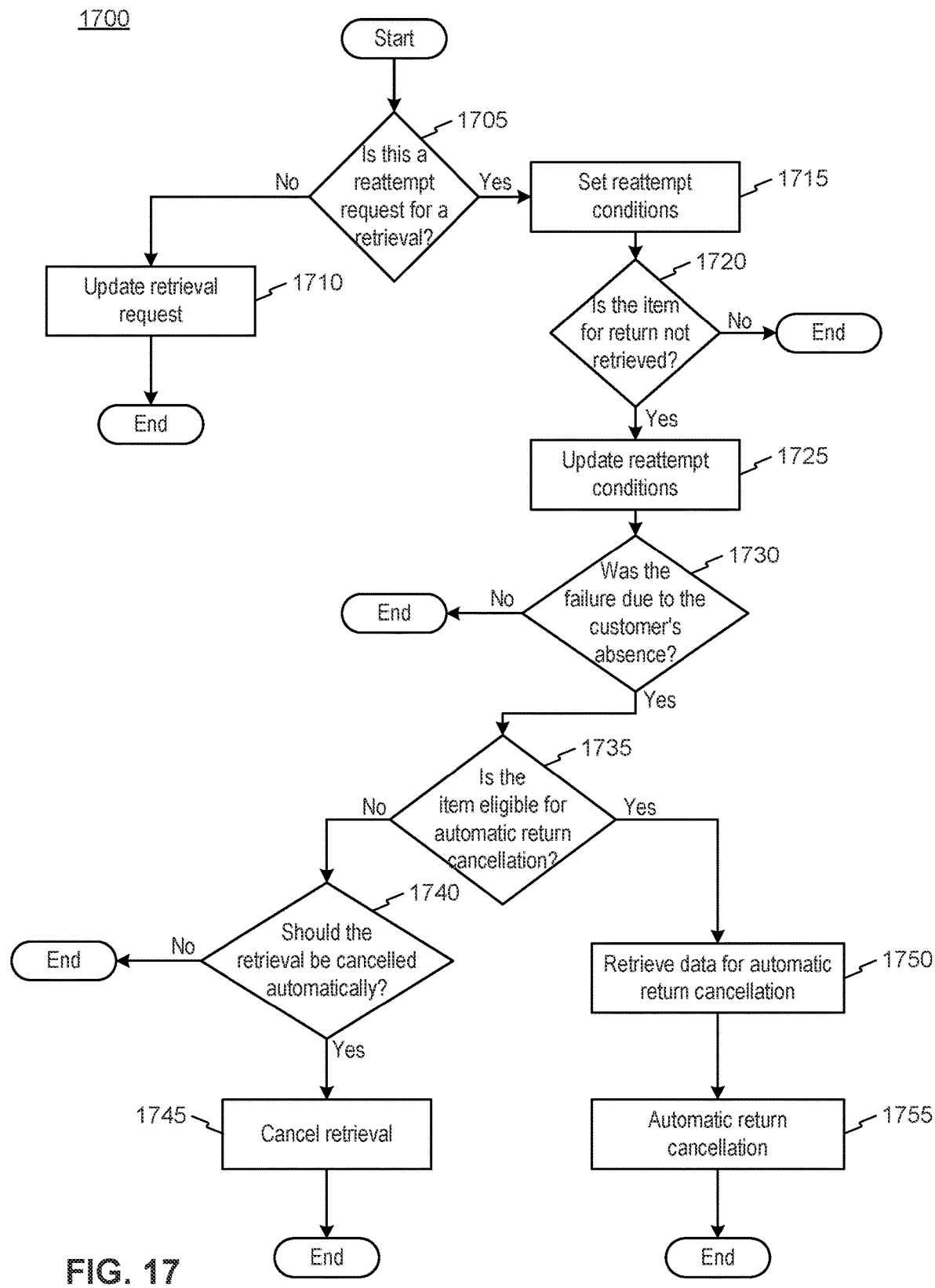
FIG. 17 illustrates exemplary arrangements of blocks which comprise collection reattempt workflow, consistent with disclosed embodiments.

FIG. 17 illustrates exemplary arrangements of blocks which comprise collection reattempt workflow 1700, consistent with the disclosed embodiments. Workflow 1700 may be performed by the workflow sub-system 375 and may rely on communication with other systems as shown on FIG. 3A-D. Workflow 1700 begins at block 1705. At block 1705, workflow sub-system 375 confirms that retrieval request is a reattempt. If it is not, workflow sub-system 375 may update the request at block 1710 and end current workflow, as shown by the way of example on FIG. 17 or alternatively initiate correct workflow (not shown).

Once workflow sub-system 375 confirms that the retrieval request is a reattempt, workflow sub-system 375 sets reattempt conditions at block 1715, e.g. try retrieval X more times. At block 1720, workflow sub-system 375 determines if order retrieval was successful, by communicating with SAT system 101. If the order is successfully retrieved ("No" branch of block 1720) workflow ends. Otherwise, workflow sub-system 375 may update reattempt conditions at block 1725. If (1) the order was not retrieved due to consumer's absence as determined by workflow sub-system 375 at block 1730 by communicating with SAT system 101 and (2) workflow sub-system 375 by communicating with external data sources 370 deems the order eligible for automatic return cancelation at block 1735, workflow sub-system 375 may collect data for automatic cancellation at block 1750 and cancel the return at block 1755. If the order is not eligible as determined by workflow sub-system 375 at block 1735 by communicating with external data sources 370 for automatic cancellation, first workflow sub-system 375 may verify if it should be canceled automatically at block 1740 by communicating with external data sources 370 and if yes cancel retrieval at block 1745. In all other cases workflow 1700 ends and additional workflows may need to be initiated by workflow sub-system 375 and/or configured by end users to handle exceptions.

Figure 18:
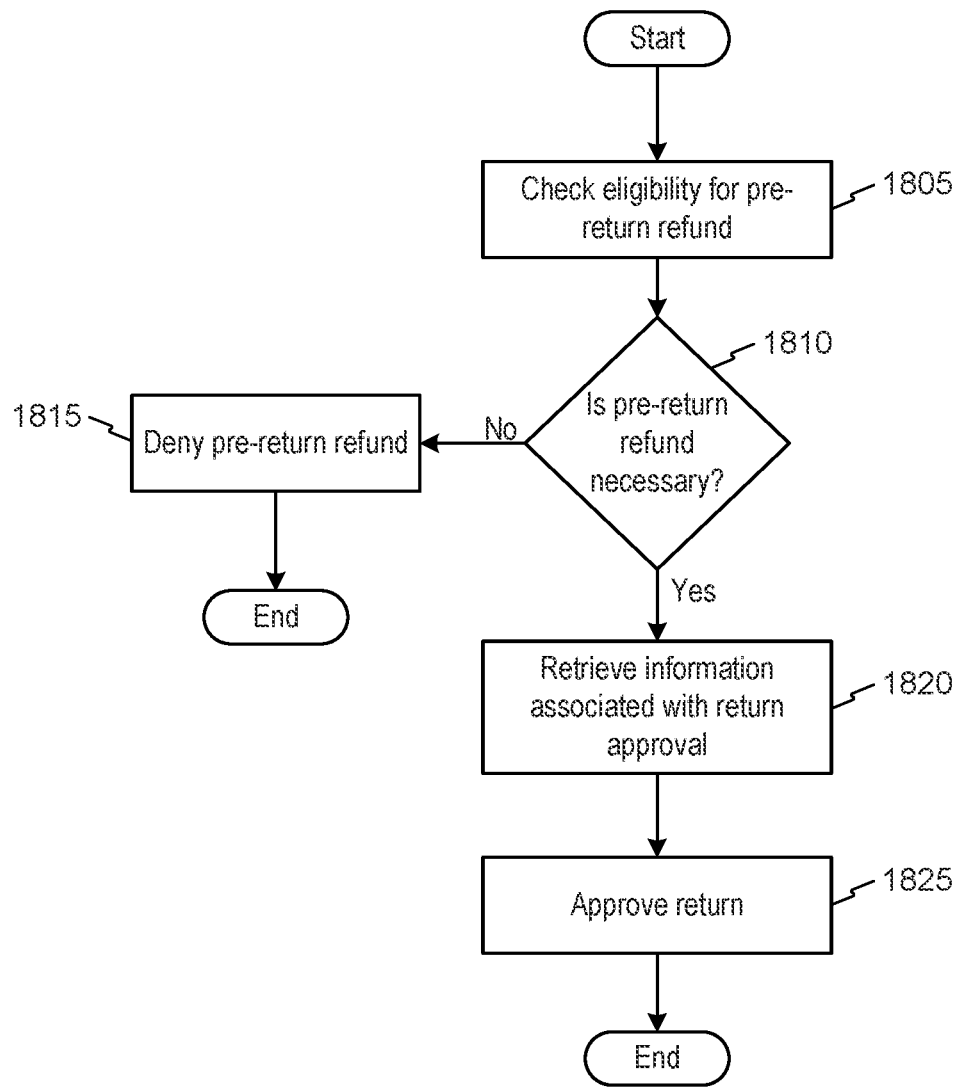
FIG. 18 illustrates exemplary arrangements of blocks which comprise collection completion workflow, consistent with disclosed embodiments.

FIG. 18 illustrates exemplary arrangements of blocks which comprise collection completion workflow 1800, consistent with the disclosed embodiments. Workflow 1800 may be performed by the workflow sub-system 375 and may rely on communication with other systems as shown on FIG. 3A-D. Workflow 1800 may begin at block 1805. At block 1805, workflow sub-system 375 verifies eligibility for pre-return refund. Workflow sub-system 375 may verify eligibility by communicating with external data sources 370, e.g. by retrieving item description or determining customer type. If workflow sub-system 375 determines that pre-return refund is not required at block 1810, workflow sub-system 375 denies pre-return refund at block 1815 and ends workflow 1800. If workflow sub-system 375 determines that pre-return refund is required at block 1810, workflow sub-system 375 retrieves information associated with return approval at block 1820 from external data sources 370 and approves return at block 1825 by communicating with systems depicted on FIGS. 1 and 3 A-D, e.g. by sending information to Creturn domains 327.

Figure 19:
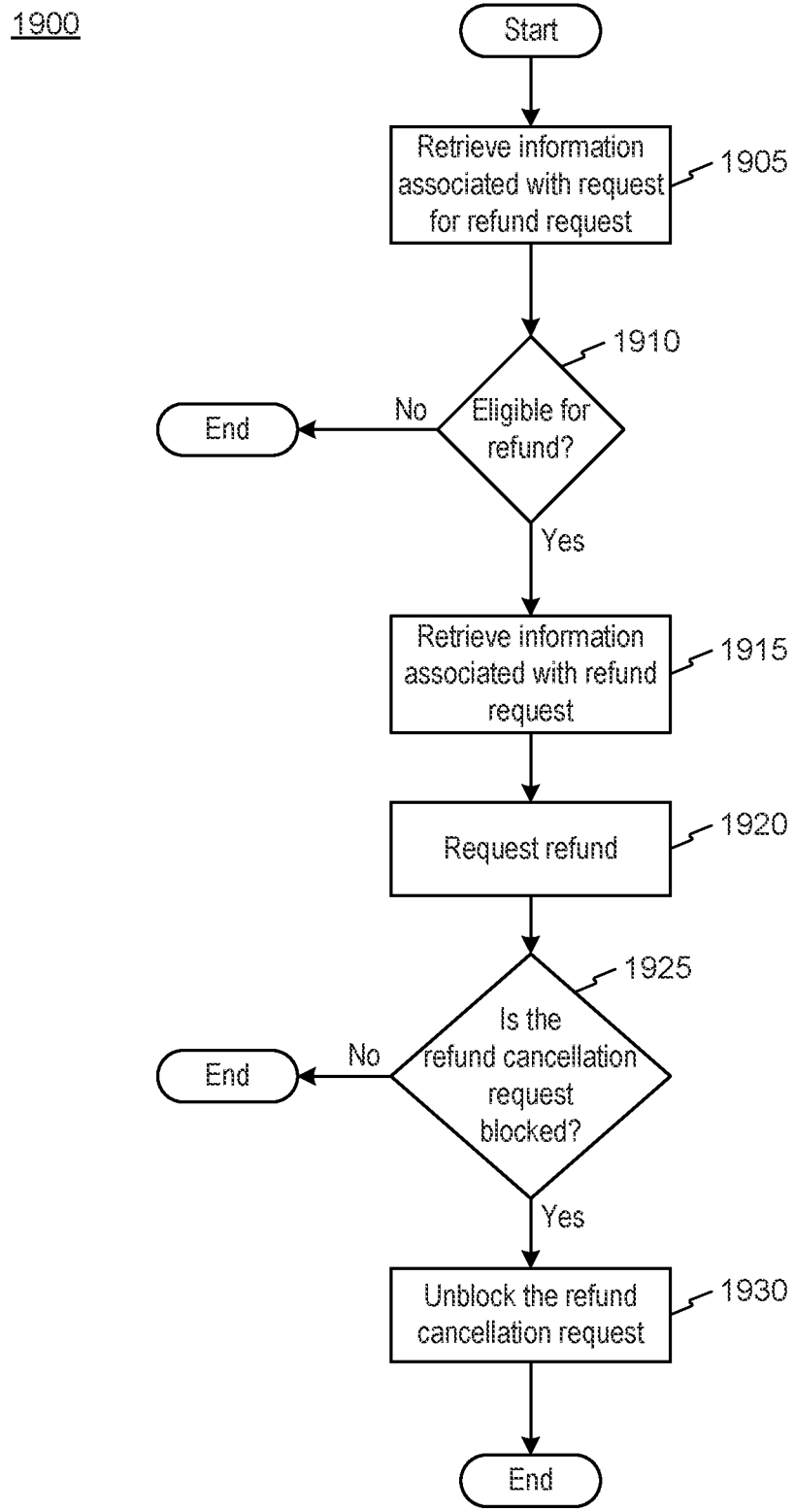
FIG. 19 illustrates exemplary arrangements of blocks which comprise refund request workflow, consistent with disclosed embodiments.

FIG. 19 illustrates exemplary arrangements of blocks which comprise refund request workflow 1900, consistent with the disclosed embodiments. Workflow 1900 may be performed by the workflow sub-system 375 and may rely on communication with other systems as shown on FIG. 3A-D. Workflow 1900 begins at block 1905. At block 1905, workflow sub-system 375 may retrieve information associated with the refund request from external data sources 370. At block 1910 workflow sub-system 375 determines based on retrieved information whether order is eligible for the refund. If it is not eligible workflow 1900 ends. If it is, workflow sub-system 375 may retrieve additional information at block 1915, additional information may include e.g. payment details and may be retrieved from external data sources 370. At block 1920, workflow sub-system 375 and request refund to be processed, by communicating with Creturn domains 327. Next, workflow sub-system 375 may determine whether refund cancelation is blocked by communicating with rule engine 362 at block 1925. If refund cancellation is not blocked workflow 1900 ends. Alternatively if it is blocked, workflow sub-system 375 unblocks the refund cancellation request by communicating with rule engine 362 at block 1930. Verification at block 1925 and unblocking at block 1930 are essential in the event refund request is withdrawn and will have to be cancelled by another workflow which may verify refund cancellation blocks with rule engine 362.

Figure 20:
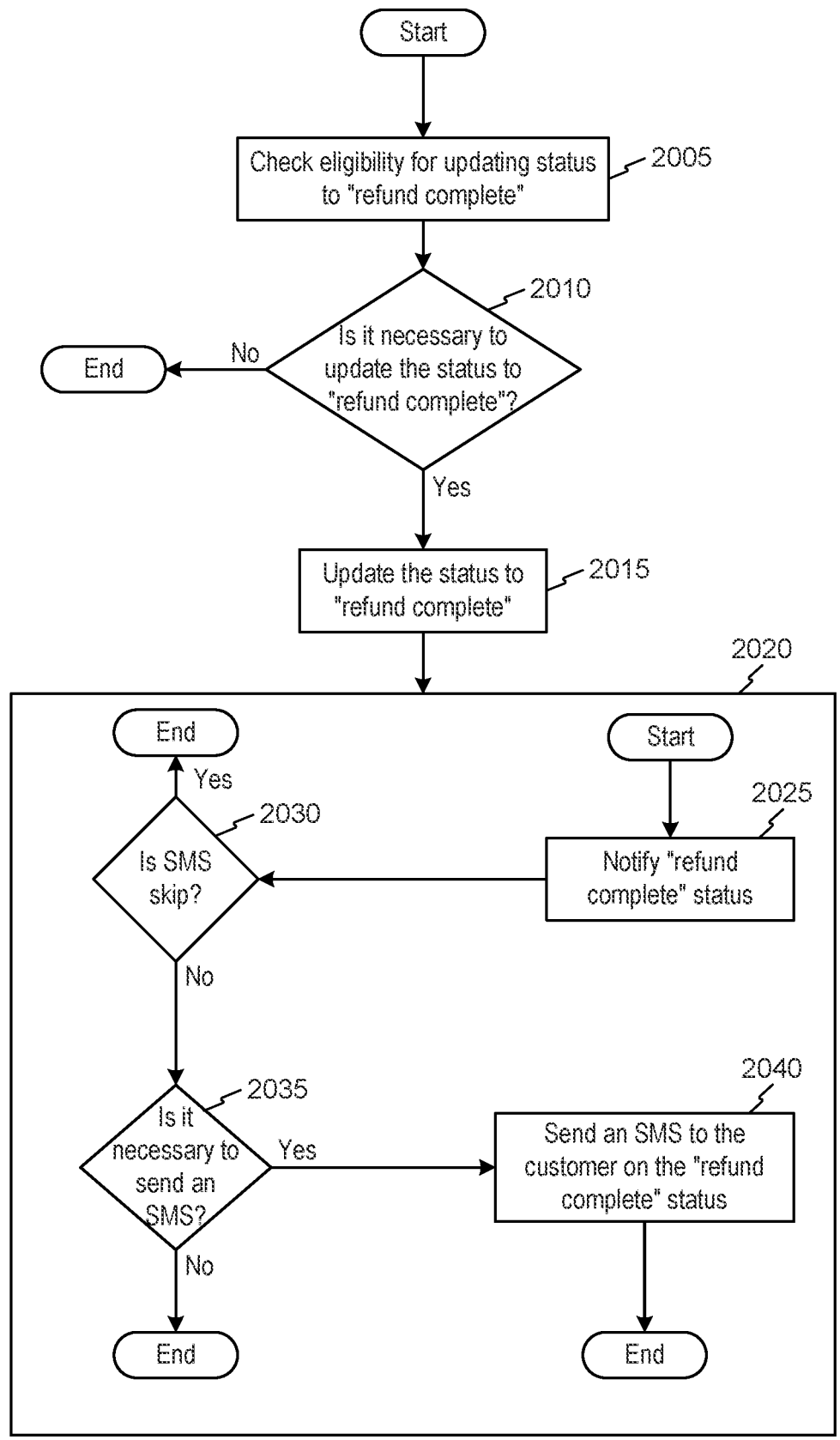
FIG. 20 illustrates exemplary arrangements of blocks which comprise refund completion workflow, consistent with disclosed embodiments.

FIG. 20 illustrates exemplary arrangements of blocks which comprise refund completion workflow 2000, consistent with the disclosed embodiments. Workflow 2000 may be performed by the workflow sub-system 375 and may rely on communication with other systems as shown on FIG. 3A-D. Workflow 200 may begin at block 2005. At block 2005, workflow sub-system 375 checks eligibility for updating status to "refund complete" by verifying with other systems as depicted on FIG. 3A-D, e.g. by retrieving status information from external data sources 370 or confirming with rule engine 362 that there are no outstanding issues (such as blocks or other pending workflows) with the request. If verification is passed and workflow sub-system 375 determines at block 2010 that it is required to change status to "refund complete," workflow sub-system 375 updates request status at block 2015. Determination at block 2010 may be based on information received in block 2005.

Supplemental notification workflow 2020 may be included. Supplemental workflow 2020 may begin at block 2025 following status update block 2015. At block 2025, workflow sub-system 375 notifies other systems shown on FIG. 1 of "refund complete" status. And in the event that messaging is allowed as determined at block 2030 and requested as determined at block 2035, workflow sub-system 375 sends message to a consumer with the status update at block 2040. Determinations at block 2030 and 2035 are performed by workflow sub-system 375 by retrieving respective information from external data sources 370.

Figure 21:
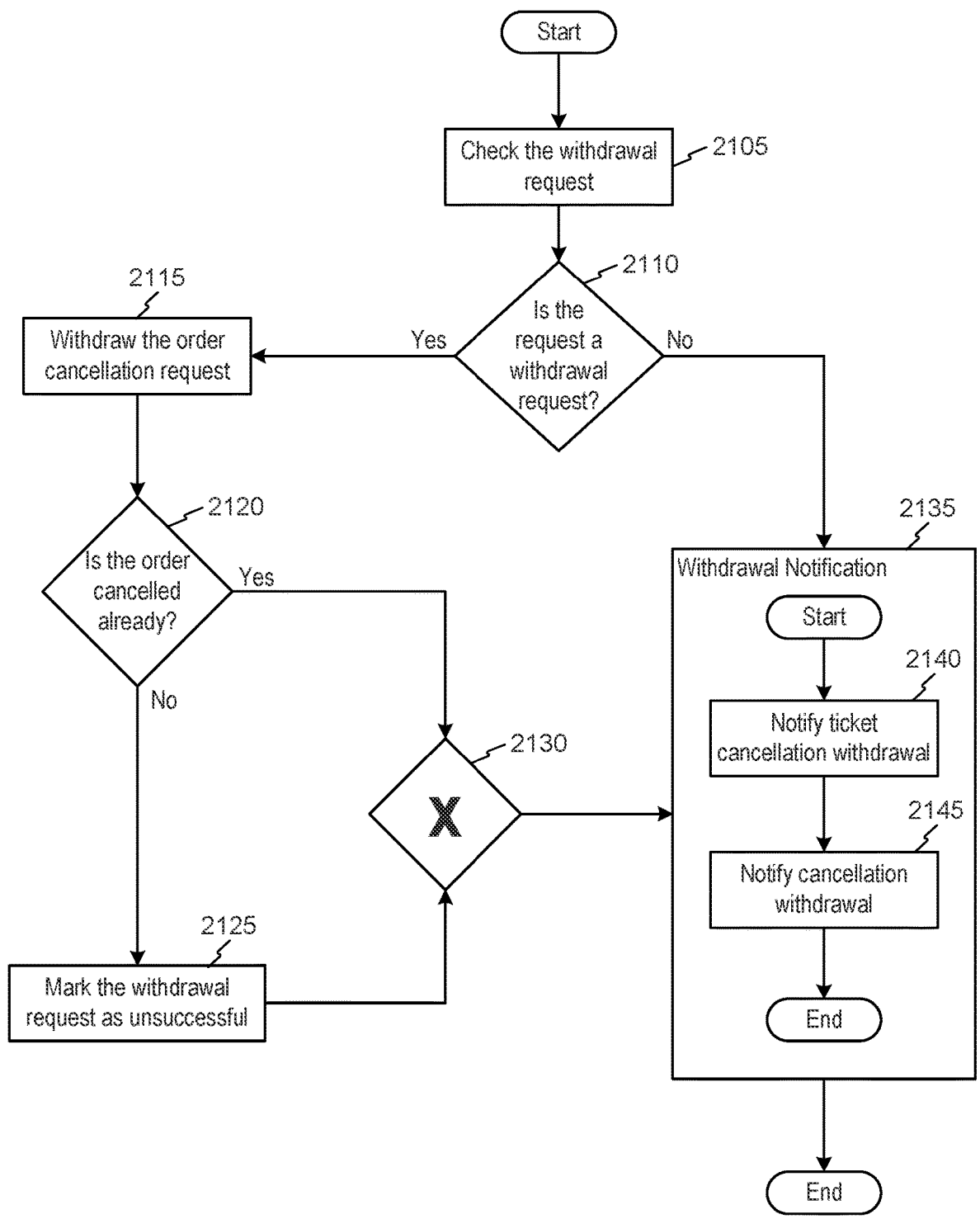
FIG. 21 illustrates exemplary arrangements of blocks which comprise cancellation withdrawal workflow, consistent with disclosed embodiments.

FIG. 21 illustrates exemplary arrangements of blocks which comprise cancellation withdrawal workflow 2100, consistent with the disclosed embodiments. Workflow 2100 may be performed by the workflow sub-system 375 and may rely on communication with other systems as shown on FIG. 3A-D. Workflow 2100 may begin at block 2105. At block 2105, workflow sub-system 375 checks the withdrawal request at block 2105 and if the request is indeed a withdrawal request as determined at block 2110 by workflow sub-system 375 by retrieving respective information from external data sources 370, attempts to withdraw the order cancellation request at block 2115. If the order is not successfully cancelled at block 2120, workflow sub-system 375 marks the withdrawal request as unsuccessful at block 2125. If (1) at block 2120, workflow sub-system 375 determines, based on data from external data sources 370, that the request is erroneously marked as withdrawal request 2110 or after order is canceled, or (2) was marked as unsuccessful at block 2125, workflow sub-system 375 may send notifications by relying on supplemental notification workflow 2135.

Supplemental notification workflow 2135 may begin at block 2140. At block 2140, workflow sub-system 375 notifies of cancelation ticket withdrawal. Additionally, workflow sub-system 375 may notify systems depicted on FIG. 1 of cancelation withdrawal at block 2145, this may be done to, for example, resume fulfilment.

Figure 22:
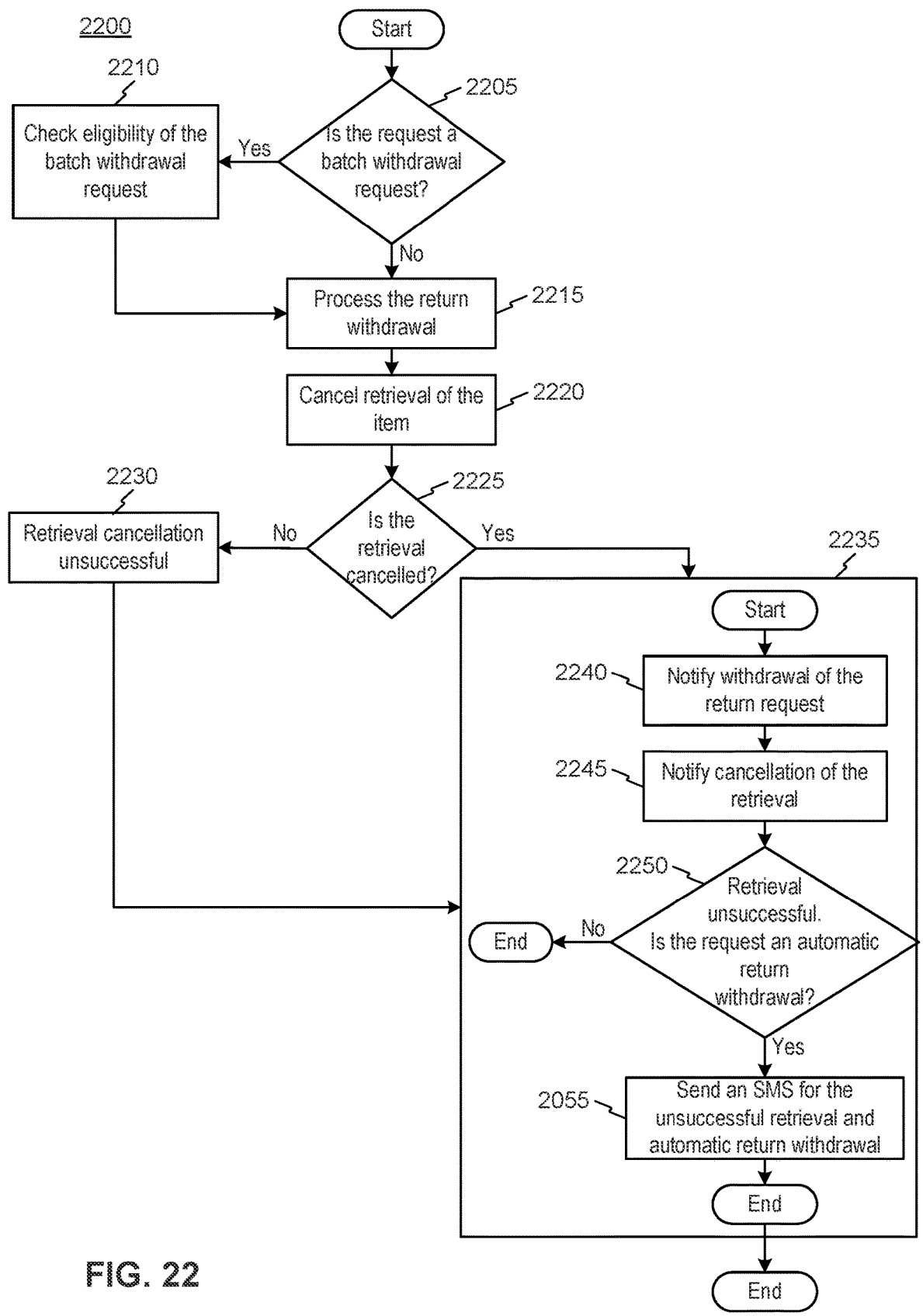
FIG. 22 illustrates exemplary arrangements of blocks which comprise return withdrawal workflow, consistent with disclosed embodiments.

FIG. 22 illustrates exemplary arrangements of blocks which comprise return withdrawal workflow 2200, consistent with the disclosed embodiments. Workflow 2200 may be performed by the workflow sub-system 375 and may rely on communication with other systems as shown on FIG. 3A-D. Workflow 2200 may begin at block 2205. At block 2205, workflow sub-system 375 may check if the request is a batch withdrawal request, in this context batch request may be for, for example, return of multiple items. If request is indeed batch request, workflow sub-system 375 may check eligibility for batch processing at block 2210, for example, by verifying if there are any overseas or 3PL sellers. If request is not a batch request or eligibility is confirmed, workflow sub-system 375 may process the return withdrawal at block 2215 and cancel retrieval of the order at block 2220 by sending cancelation details to SAT system 101. If SAT system 101 reports that cancellation is unsuccessful at block 2225, workflow sub-system 375 may mark retrieval as unsuccessful at block 2230.

Supplemental notification workflow 2235 may be included. Supplemental workflow 2235 may begin at block 2240 following cancelation of retrieval at block 2225 or unsuccessful retrieval at block 2230. At block 2240, workflow sub-system 375 notifies systems depicted on FIG. 1 of withdrawal of the return request and cancellation of retrieval at block 2245 if appropriate. Additionally, if retrieval is unsuccessful and request is an automatic request for withdrawal as determined at block 2250 based on information from block 2230, workflow sub-system 375 sends a message to the consumer of unsuccessful retrieval at block 2055.

Figure 23:
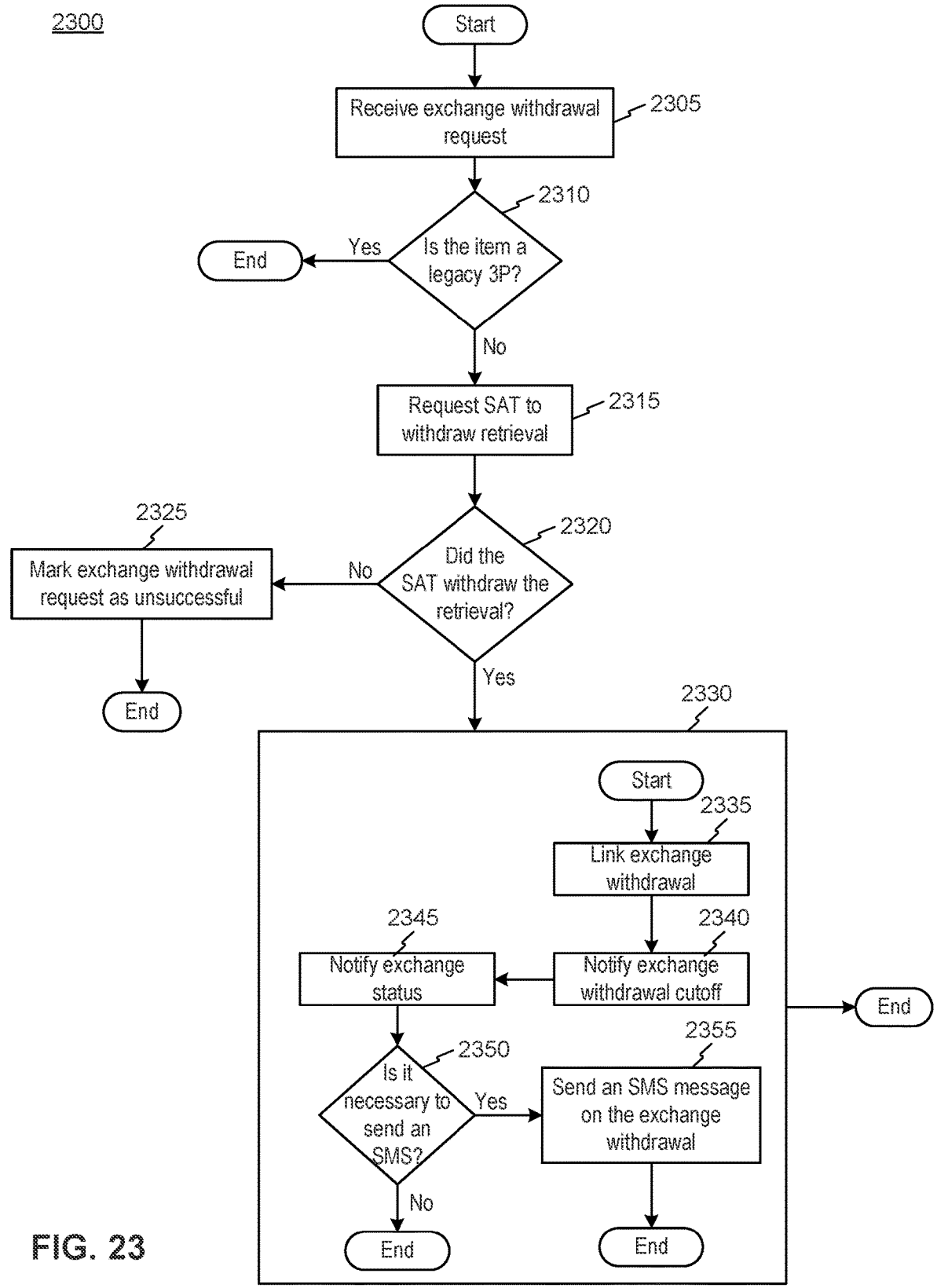
FIG. 23 illustrates exemplary arrangements of blocks which comprise exchange withdrawal workflow, consistent with disclosed embodiments.

FIG. 23 illustrates exemplary arrangements of blocks which comprise exchange withdrawal workflow 2300, consistent with the disclosed embodiments. Workflow 2300 may be performed by the workflow sub-system 375 and may rely on communication with other systems as shown on FIG. 3A-D. Workflow 2300 may begin at block 2305. At block 2305, workflow sub-system 375 receives an exchange withdrawal request at block 2305. At block 2310, workflow sub-system 375 retrieves item information form external data sources 370 and if the item is not 3PL requests SAT system 101 to withdraw retrieval at block 2315. If SAT system 101 reports that it failed to withdraw the retrieval at block 2320, workflow sub-system 375 marks exchange withdrawal request as unsuccessful at block 2325. Otherwise, workflow 2300 may end or initiate supplemental notification workflow 2330. Supplemental notification workflow is based on same building blocks as supplemental workflow 1350 disclosed in reference to FIG. 13, with only difference that it is applied in context of exchange withdrawal and not post-exchange process. Specifically, in workflow 2330, blocks 2335, 2340, 2345 operate substantially identically to blocks of workflow 1355, 1360, 1365 of workflow 1350 as shown in FIG. 13. Block 2350 is substantially identical to block 2035 of workflow 2020. At block 2355, workflow sub-system 375 sends message to a consumer with the status update on exchange withdrawal.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for workflow editing, the system comprising:
    a memory storing instructions; and
    at least one processor configured to execute the instructions for:
        displaying on a graphical user interface an existing workflow;
        receiving edits to the existing workflow from a user, wherein the edits comprise at least one code-less modification of the existing workflow;
        transforming the at least one code-less modification to at least one system-readable modification;
        creating a modified workflow based on the at least one system-readable modification; and
        propagating the modified workflow to replace the existing workflow.

2. The computer-implemented system of claim 1, wherein the existing workflow is selected from the group consisting of a cancellation workflow, a post-cancellation workflow, a cancellation approval workflow, a stop-release workflow, a return workflow, a post return process workflow, a return approval workflow, an exchange workflow, a post exchange workflow, an unshipped exchange workflow, a tracking collection workflow, a delivery tracking workflow, a collection reattempt workflow, a collection completion workflow, a refund request workflow, a cancellation withdrawal workflow, a return withdrawal workflow, and an exchange withdrawal workflow.

3. The computer-implemented system of claim 1, wherein the existing workflow comprises a plurality of blocks and interconnections among the plurality of blocks.

4. The computer-implemented system of claim 3, wherein the plurality of blocks each represent pre-coded instructions for implementing one or more actions.

5. The computer-implemented system of claim 3, wherein the at least one code-less modification of the existing workflow comprises at least one manipulation of the plurality of blocks or the interconnections via the graphical user interface.

6. The computer-implemented system of claim 3, wherein the at least one code-less modification of the existing workflow comprises one or more of:
    dragging and dropping, adding, removing, or moving.

7. The computer-implemented system of claim 1, wherein creating the modified workflow comprises verifying the modified workflow for at least one error.

8. The computer-implemented system of claim 7, wherein the at least one error comprises a looped logic, an endless workflow, or an improper modification or interconnection of blocks.

9. The computer-implemented system of claim 1, wherein the modified workflow is propagated to one or more networked systems based on affiliation.

10. The computer-implemented system of claim 1, wherein the modified workflow is propagated to one or more networked systems based on user permission.

11. A computer-implemented method for workflow editing comprising:
    displaying on a graphical user interface an existing workflow;
    receiving edits to the existing workflow from a user, wherein the edits comprise at least one code-less modification of the existing workflow;
    transforming the at least one code-less modification to at least one system-readable modification;
    creating a modified workflow based on the at least one system-readable modification; and
    propagating the modified workflow to replace the existing workflow.

12. The computer-implemented method of claim 11, wherein the existing workflow is selected from the group consisting of a cancellation workflow, a post-cancellation workflow, a cancellation approval workflow, a stop-release workflow, a return workflow, a post return process workflow, a return approval workflow, an exchange workflow, a post exchange workflow, an unshipped exchange workflow, a tracking collection workflow, a delivery tracking workflow, a collection reattempt workflow, a collection completion workflow, a refund request workflow, a cancellation withdrawal workflow, a return withdrawal workflow, and an exchange withdrawal workflow.

13. The computer-implemented method of claim 11, wherein the existing workflow comprises a plurality of blocks and interconnections among the plurality of blocks.

14. The computer-implemented method of claim 13, wherein the plurality of blocks each represent pre-coded instructions for implementing one or more actions.

15. The computer-implemented method of claim 13, wherein the at least one code-less modification of the existing workflow comprises at least one manipulation of the plurality of blocks or the interconnections via the graphical user interface.

16. The computer-implemented method of claim 13, wherein the at least one code-less modification of the existing workflow comprises one or more of:

dragging and dropping, adding, removing, or moving.

17. The computer-implemented method of claim 11, wherein creating the modified workflow comprises verifying the modified workflow for at least one error.

18. The computer-implemented method of claim 17, wherein the at least one error comprises a looped logic, an endless workflow, or an improper modification or interconnection of blocks.

19. The computer-implemented method of claim 11, wherein the modified workflow is propagated to a limited set of one or more networked systems based on affiliation.

20. The computer-implemented method of claim 11, wherein the modified workflow is propagated to a limited set of one or more networked systems based on user permission.

\* \* \* \* \*